(12) United States Patent
Min et al.

(10) Patent No.: US 12,283,722 B2
(45) Date of Patent: Apr. 22, 2025

(54) FIXING STRUCTURE OF ELECTRODE TERMINAL, AND BATTERY, BATTERY PACK AND VEHICLE INCLUDING THE SAME

(71) Applicant: LG ENERGY SOLUTION, LTD., Seoul (KR)

(72) Inventors: Geon-Woo Min, Daejeon (KR); Min-Ki Jo, Daejeon (KR); Do-Gyun Kim, Daejeon (KR); Kwang-Su Hwangbo, Daejeon (KR); Jae-Woong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/269,583

(22) PCT Filed: Nov. 24, 2022

(86) PCT No.: PCT/KR2022/018773
§ 371 (c)(1),
(2) Date: Jun. 26, 2023

(87) PCT Pub. No.: WO2023/096390
PCT Pub. Date: Jun. 1, 2023

(65) Prior Publication Data
US 2024/0055738 A1 Feb. 15, 2024

(30) Foreign Application Priority Data
Nov. 24, 2021 (KR) .................. 10-2021-0163457
Jul. 7, 2022 (KR) .................. 10-2022-0083905

(51) Int. Cl.
*H01M 50/567* (2021.01)
*H01M 10/04* (2006.01)
(Continued)

(52) U.S. Cl.
CPC ..... *H01M 50/567* (2021.01); *H01M 10/0431* (2013.01); *H01M 50/107* (2021.01);
(Continued)

(58) Field of Classification Search
CPC ......... H01M 10/0431; H01M 10/0525; H01M 2220/20; H01M 50/107; H01M 50/167;
(Continued)

(56) References Cited

U.S. PATENT DOCUMENTS

| 2009/0004559 | A1 | 1/2009 | Gardner et al. |
| 2020/0185669 | A1 | 6/2020 | Oki et al. |
| 2022/0231345 | A1* | 7/2022 | Hwangbo ........... H01M 50/167 |

FOREIGN PATENT DOCUMENTS

| CN | 113346201 A | 9/2021 |
| CN | 113659290 A | 11/2021 |

(Continued)

OTHER PUBLICATIONS

International Search Report for PCT/KR2022/018773 (PCT/ISA/210) mailed on Mar. 6, 2023.
(Continued)

*Primary Examiner* — Lingwen R Zeng
(74) *Attorney, Agent, or Firm* — Birch, Stewart, Kolasch & Birch, LLP

(57) ABSTRACT

A fixing structure of an electrode includes a battery housing having a bottom with a perforation hole; an electrode terminal fixed to the bottom; and a terminal gasket interposed between the electrode terminal and the bottom. The electrode terminal includes a neck portion inserted into the perforation hole; a head portion connected to one end of the neck portion and having a cross section larger than the cross section of the perforation hole and extending along one surface of the bottom; a protrusion connected to the other end of the neck portion and extending along an axial
(Continued)

direction of the battery housing from the other surface of the bottom; a diameter-enlarged portion configured to extend in a centrifugal direction from the protrusion; and a front end surface at an axial end of the protrusion. The diameter-enlarged portion may be a fastening member at an outer circumference of the protrusion.

39 Claims, 13 Drawing Sheets

(51) Int. Cl.
  *H01M 50/107* (2021.01)
  *H01M 50/167* (2021.01)
  *H01M 50/186* (2021.01)
  *H01M 50/193* (2021.01)
  *H01M 50/213* (2021.01)
  *H01M 50/536* (2021.01)
  *H01M 50/538* (2021.01)
  *H01M 50/559* (2021.01)
  *H01M 10/0525* (2010.01)
  *H01M 50/179* (2021.01)
  *H01M 50/188* (2021.01)
  *H01M 50/197* (2021.01)
  *H01M 50/548* (2021.01)

(52) U.S. Cl.
  CPC ....... *H01M 50/167* (2021.01); *H01M 50/186* (2021.01); *H01M 50/193* (2021.01); *H01M 50/213* (2021.01); *H01M 50/536* (2021.01); *H01M 50/538* (2021.01); *H01M 50/559* (2021.01); *H01M 10/0525* (2013.01); *H01M 50/179* (2021.01); *H01M 50/188* (2021.01); *H01M 50/197* (2021.01); *H01M 50/548* (2021.01); *H01M 2220/20* (2013.01); *Y02E 60/10* (2013.01)

(58) Field of Classification Search
  CPC ............. H01M 50/179; H01M 50/186; H01M 50/188; H01M 50/193; H01M 50/197; H01M 50/213; H01M 50/536; H01M 50/538; H01M 50/548; H01M 50/559; H01M 50/567; Y02E 60/10
  See application file for complete search history.

(56) References Cited

FOREIGN PATENT DOCUMENTS

| | | |
|---|---|---|
| CN | 114614101 A | 6/2022 |
| JP | 8-102313 A | 4/1996 |
| JP | 11-135151 A | 5/1999 |
| JP | 2003-151516 A | 5/2003 |
| JP | 2003-272574 A | 9/2003 |
| JP | 2003-272601 A | 9/2003 |
| JP | 2005-149909 A | 6/2005 |
| JP | 2008-192552 A | 8/2008 |
| JP | 2009-295356 A | 12/2009 |
| JP | 4501361 B2 | 7/2010 |
| JP | 2010-529624 A | 8/2010 |
| JP | 2016-195036 A | 11/2016 |
| JP | 2019-46639 A | 3/2019 |
| KR | 10-1483700 B1 | 1/2015 |
| WO | WO 2018/049833 A1 | 3/2019 |

OTHER PUBLICATIONS

Extended European Search Report for European Application No. 22899072.7, dated Feb. 26, 2025.

* cited by examiner

FIXING STRUCTURE OF ELECTRODE TERMINAL, AND BATTERY, BATTERY PACK AND VEHICLE INCLUDING THE SAME

TECHNICAL FIELD

The present disclosure relates to a fixing structure of an electrode terminal, and a battery, a battery pack and a vehicle including the same.

The present application claims priority to Korean Patent Application No. 10-2021-0163457 filed on Nov. 24, 2021, and Korean Patent Application No. 10-2022-0083905 filed on Jul. 7, 2022 in the Republic of Korea, the disclosures of which are incorporated herein by reference.

BACKGROUND ART

Secondary batteries that are easily applicable to various product groups and have electrical characteristics such as high energy density are universally applied not only to portable devices but also to electric vehicles (EVs), hybrid electric vehicles (HEVs), a plug-in hybrid electric vehicles (PHEVs) or the like driven by an electric drive source. Hereinafter, the electric vehicles will be used as a concept including EVs, HEVs, PHEVs or the like.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A secondary battery has an operating voltage of about 2.5V to 4.5V. Therefore, when a higher output voltage is required, a battery pack is configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing together with an electrolyte to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap of a sealing body that seals the opening of the battery housing, and the negative electrode terminal is the battery housing.

However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation due to a small cross section area of the strip-shaped electrode tab.

For small cylindrical batteries with a form factor of 1865 or 2170, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collector is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collector to a bent surface of an uncoated portion. FIG. 4 is a sectional view showing the tab-less cylindrical battery, taken along a longitudinal direction Y.

Referring to FIGS. 1 to 4, a positive electrode 10 and a negative electrode 11 have a structure in which a sheet-shaped current collector 20 is coated with an active material 21, and include an uncoated portion 22 at one long side along the winding direction X.

An electrode assembly A is manufactured by sequentially stacking the positive electrode 10 and the negative electrode 11 together with two sheets of separators 12 as shown in FIG. 2 and then winding them in one direction X. At this time, the uncoated portions of the positive electrode 10 and the negative electrode 11 are arranged in opposite directions.

After the winding process, the uncoated portion 10a of the positive electrode 10 and the uncoated portion 11a of the negative electrode 11 are bent toward the core. After that, current collectors 30, 31 are welded and coupled to the uncoated portions 10a, 11a, respectively.

An electrode tab is not separately coupled to the positive electrode uncoated portion 10a and the negative electrode uncoated portion 11a, the current collectors 30, 31 are connected to external electrode terminals, and a current path is formed with a large cross-sectional area along the winding axis direction of electrode assembly A (see an arrow in FIG. 3), which has an advantage of lowering the resistance of the battery. This is because resistance is inversely proportional to the cross-sectional area of the path through which the current flows.

However, when the form factor of the cylindrical battery increases and the magnitude of the charging current during rapid charging increases, the heat problem also occurs again in the tab-less cylindrical battery.

Specifically, the conventional tab-less cylindrical battery 40 includes a battery housing 41 and a sealing body 42 as shown in FIG. 4. The sealing body 42 includes a cap 42a, a sealing gasket 42b and a connection plate 42c. The sealing gasket 42b surrounds the edge of the cap 42a and is fixed by a crimping portion 43. In addition, the electrode assembly A is fixed in the battery housing 41 by a beading portion 44 to prevent vertical movement.

Typically, the positive electrode terminal is the cap 42a of the sealing body 42, and the negative electrode terminal is the battery housing 41. Accordingly, the current collector coupled to the uncoated portion 10a of the positive electrode 10 is electrically connected to the connection plate 42c attached to the cap 42a through a lead 45 in the form of a strip. In addition, the current collector 31 coupled to the uncoated portion 11a of the negative electrode 11 is electrically connected to the bottom of the battery housing 41.

An insulator 46 covers the current collector 30 to prevent the battery housing 41 and the uncoated portion 10a of the positive electrode 10 having different polarities from contacting each other and causing a short circuit.

When the current collector 30 is connected to the connection plate 42c, the lead 45 in the form of a strip is used. The lead 45 is separately attached to the current collector 30 or is manufactured integrally with the current collector 30. However, since the lead 45 is in the form of a thin strip, its cross-sectional area is small, and thus a lot of heat is generated when the rapid charging current flows. In addition, the excessive heat generated from the lead 45 is transferred to the electrode assembly A to shrink the separator 12, which may cause an inner short circuit that is a main cause of thermal runaway.

That is, according to the conventional cylindrical battery structure, the portion of the current collector 31 facing the bottom of the battery housing 41 is in direct contact with the bottom of the battery housing 41, so that a sufficiently large cross-sectional area is already secured in the direction of current movement, so there is no problem such as overheating. Meanwhile, since the current collector 30 connected to the sealing body 42 that is crimped at the opening of the battery housing 41 is connected to the sealing body 42 through the lead 45 in the form of a strip, it inevitably causes the overheating problem described above.

In addition, due to the manufacturing process, the lead 45 occupies a significant installation space within the battery housing 41. Therefore, the cylindrical battery 40 including the lead 45 has low space efficiency, so there is a limit in increasing the energy density.

Moreover, in order to connect the conventional tab-less cylindrical batteries 40 in series and/or in parallel, it is necessary to connect a bus bar component to the cap 42a of the sealing body 42 and the bottom surface of the battery housing 41, which deteriorates the space efficiency. A battery pack mounted on an electric vehicle includes hundreds of cylindrical batteries 40. Therefore, the inefficiency of the electrical wiring causes considerable inconvenience in the assembly process of the electric vehicle and the maintenance of the battery pack.

In addition, the crimping portion 43 provided on the edge side of the sealing body 42 is exposed to the upper portion of the cylindrical battery 40 as a portion having a negative polarity. In FIG. 4, the upper part of the crimping portion 43 is shown to be large, but in fact, the area of the crimping portion 43 exposed to the top is very small compared to the area of the sealing body 42. Therefore, in order to stably connect the bus bar components, the sealing body 42 crimped to the opening of the battery housing 41 and the bottom of the battery housing 41 are inevitably used.

DISCLOSURE

Technical Problem

The present disclosure is designed to solve the problems of the related art, and therefore the present disclosure is directed to lowering the inner resistance of a cylindrical battery and increasing the energy density by improving an electrode terminal structure of the cylindrical battery to increase the space efficiency in a battery housing.

The present disclosure is also directed to improving the electrode terminal structure of a cylindrical battery to solve the internal heating problem caused during rapid charging by expanding the cross-sectional area of a current path.

The present disclosure is also directed to providing a cylindrical battery having an improved structure that allows electrical wiring for serial and/or parallel connection of the cylindrical batteries to be performed at one side of the cylindrical batteries.

The present disclosure is also directed to providing a battery pack manufactured using the cylindrical battery with an improved structure and a vehicle including the battery pack.

The technical objects of the present disclosure are not limited to the above, and other objects and advantages of the present disclosure not mentioned herein can be understood by the following disclosure and will be more clearly understood by embodiments of the present disclosure. In addition, it will be readily understood that the objects and advantages of the present disclosure can be realized by means defined in the claims and combinations thereof.

Technical Solution

In one aspect of the present disclosure, there is provided a fixing structure of an electrode terminal, comprising: a battery housing having an open end at a first side and a bottom with a perforation hole at a second side opposite the first side, the bottom having a first surface and a second surface opposite the first surface; an electrode terminal fixed to the bottom; and a terminal gasket located between the electrode terminal and the bottom.

The electrode terminal may include a neck portion having a cross section smaller than a cross section of the perforation hole, the neck portion being inserted into the perforation hole; a head portion extending from a first end of the neck portion, the head portion having a cross section larger than the cross section of the perforation hole, the head portion extending along the first surface of the bottom; a protrusion extending from a second end of the neck portion opposite the first end along an axial direction of the battery housing from the second surface of the bottom; a diameter-enlarged portion extending in a radial direction from the protrusion; and a front end surface at an axial end of the protrusion, wherein the diameter-enlarged portion may be a fastening member at an outer circumference of the protrusion.

The outer circumference of the protrusion may have a fastening groove extending along a circumferential direction, and the fastening member may be inserted into the fastening groove.

The fastening groove may have a male thread shape, and the fastening member may be a nut with a female thread.

The fastening groove may be an O-shaped groove, and the fastening member may be a C-shaped ring.

A surface of the fastening member facing the bottom may include a sidewall surface that is gradually spaced farther away from the bottom outward in the radial direction.

When the fastening member is coupled to the fastening groove, the sidewall surface may compress the terminal gasket toward the bottom of the battery housing.

The fixing structure of an electrode terminal may further comprise a first sealing coating layer on an interface between the terminal gasket and the bottom of the battery housing.

The first sealing coating layer may include silicone resin, silicone acrylate or polyamideimide.

The fixing structure of an electrode terminal may further comprise a second sealing coating layer covering an exposed interface between the fastening member and the terminal gasket.

Optionally, the second sealing coating layer may cover an exposed interface between the terminal gasket and the bottom.

The second sealing coating layer may include silicone resin, silicone acrylate or polyamideimide.

The front end surface may be spaced further away from the second surface of the bottom in the axial direction of the battery housing than the diameter-enlarged portion is spaced from the second surface of the bottom.

The front end surface may include a flat portion.

The fastening member may have a first region that is gradually spaced farther away from the bottom of the battery housing while extending in the radial direction from the protrusion.

In the first region, an angle between a surface of the fastening member facing the bottom and the bottom may be greater than 0 degrees and equal to or less than 60 degrees.

A diameter of a section of the diameter-enlarged portion may be greater than a diameter of the perforation hole.

A diameter of a section of the diameter-enlarged portion may gradually increase away from the bottom of the battery housing.

A portion of the terminal gasket located between the head portion and the bottom of the battery housing may be in a compressed state.

In another aspect of the present disclosure, there is also provided a battery, which includes the fixing structure of an electrode terminal having at least one of the above features.

The battery may comprise an electrode assembly in which a first electrode and a second electrode are wound with a separator interposed therebetween, the electrode assembly including an uncoated portion of the first electrode and an uncoated portion of the second electrode extending from opposite ends of the electrode assembly beyond the separator; a battery housing accommodating the electrode assembly therein; the battery housing having an open end at a first side and a bottom opposite at a second side opposite the first side, the bottom having a perforation hole, the bottom having a first surface and a second surface opposite the first surface, the battery housing being electrically connected to the first electrode; an electrode terminal located in the perforation hole formed so as not to contact an inner wall of the perforation hole, the electrode terminal being electrically connected to the second electrode, the electrode terminal including: a neck portion having a cross section smaller than a cross section of the perforation hole, the neck portion being inserted into the perforation hole; a head portion connected to a first end of the neck portion, the head portion having a cross section larger than the cross section of the perforation hole, the head portion extending along the first surface of the bottom; a protrusion extending from a second end of the neck portion opposite the first end along an axial direction of the battery housing from the second surface of the bottom; a diameter-enlarged portion extending in a radial direction from the protrusion, the diameter-enlarged portion being a fastening member at an outer circumference of the protrusion; and a front end surface at an axial end of the protrusion; a terminal gasket located between the electrode terminal and the perforation hole; and a sealing body configured to seal the open end of the battery housing while being insulated from the battery housing.

The battery housing may include a beading portion adjacent to the open end, and the sealing body may include a cap with no polarity and a sealing gasket located between an edge of the cap and the open end of the battery housing.

The battery housing may further include a crimping portion extending inward to overlap and fix the edge of the cap together with the sealing gasket.

The battery may further comprise a first current collector coupled to the uncoated portion of the first electrode, and at least a part of an edge of the first current collector not in contact with the uncoated portion of the first electrode may be located between the beading portion and the sealing gasket and fixed by the crimping portion.

At least a part of the edge of the first current collector may be fixed by welding to an inner circumference of the beading portion adjacent to the crimping portion.

The battery may further comprise a second current collector coupled to the uncoated portion of the second electrode, and at least a part of the second current collector may be welded to the front end surface of the electrode terminal.

The battery may further comprise an insulator located between the second current collector and the second surface of the bottom of the battery housing and between an inner circumference of a sidewall of the battery housing extending from the bottom and the electrode assembly.

The battery has a cylindrical shape and a ratio obtained by dividing a diameter of the battery by a height of the battery may be greater than 0.4.

An AC resistance measured through the electrode terminal of the battery and the first surface of the bottom of the battery housing may be 4 milliohms or less.

In another aspect of the present disclosure, there is also provided a battery pack, comprising a plurality of batteries described above, and a vehicle, comprising the battery pack.

Advantageous Effects

According to an embodiment of the present disclosure, it is possible to lower the inner resistance of a cylindrical battery and increase the energy density by improving an electrode terminal structure so that the leads can be excluded and thereby increasing the space efficiency in a battery housing.

According to another embodiment of the present disclosure, it is possible to solve the internal heating problem caused during rapid charging by improving the electrode terminal structure of a battery to expand the cross-sectional area of a current path so that the electrode terminal and the current collector can be directly connected.

According to still another embodiment of the present disclosure, electrical wiring for serial and/or parallel connection of the cylindrical batteries may be performed at one side of the batteries by disposing both electrodes on the bottom that is one side of the cylindrical batteries.

According to still another embodiment of the present disclosure, it is possible to provide a battery pack manufactured using the cylindrical battery with an improved structure and a vehicle including the battery pack.

In addition to the above effects, specific effects of the present disclosure will be described together while explaining specific details for carrying out the present disclosure.

BEST MODE

Figure 1:
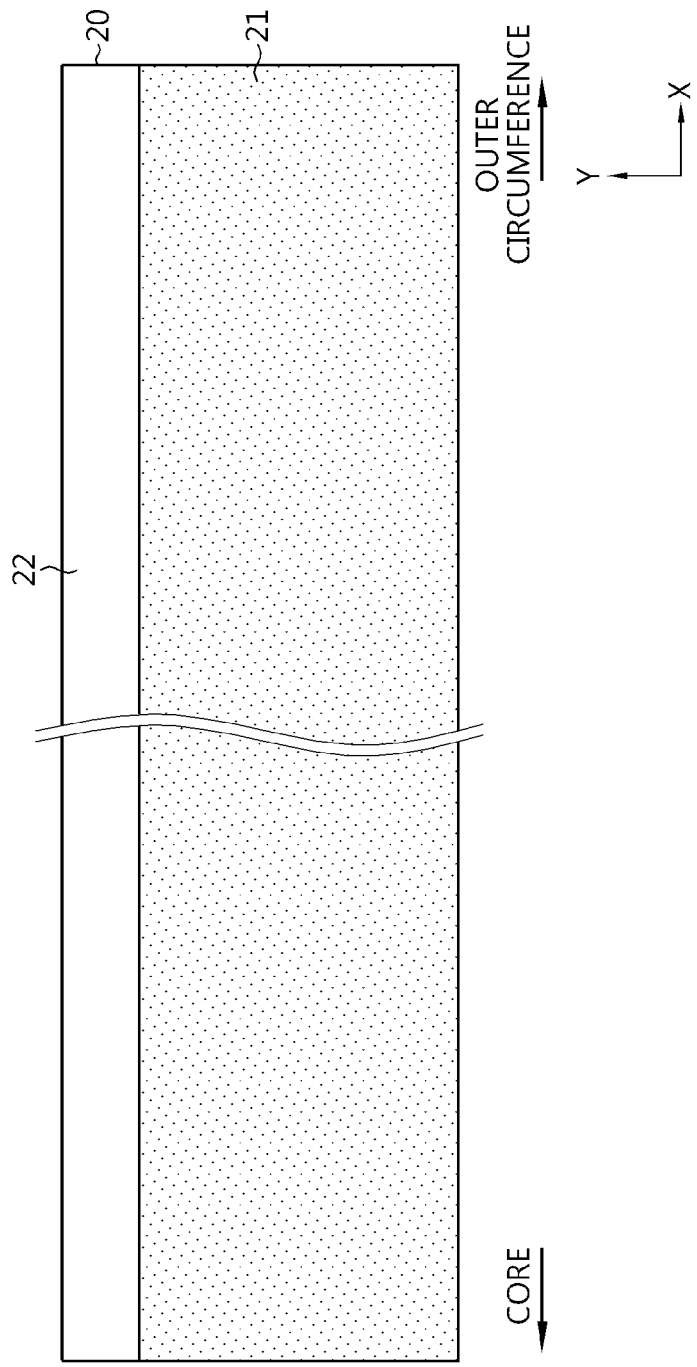
FIG. 1 is a plan view showing a structure of an electrode used for a conventional tab-less cylindrical battery.

The foregoing objects, features, and advantages will be described later in detail with reference to the accompanying drawings, and accordingly, the technical idea of the present disclosure will be able to be easily implemented by those skilled in the art. In describing the present disclosure, if it is determined that a detailed description of a known technology related to the present disclosure may unnecessarily obscure the gist of the present disclosure, the detailed description will be omitted. Hereinafter, preferred embodiments according to the present disclosure will be described in detail with reference to the accompanying drawings. In the drawings, the same reference numerals are used to indicate the same or similar components.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

Hereinafter, when an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Singular expressions used in this specification include plural expressions unless the context clearly indicates otherwise. In this application, terms such as "including" or "comprising" should not be construed as necessarily including all of the various components or steps described in the specification, and it should be construed that some of the components or some of the steps may not be included, or additional components or steps may be further included.

Also, singular expressions used in this specification include plural expressions unless the context clearly indicates otherwise. In this application, terms such as "including" or "comprising" should not be construed as necessarily including all of the various components or steps described in the specification, and it should be construed that some of the components or some of the steps may not be included, or additional components or steps may be further included.

Throughout the specification, "A and/or B" refers to either A or B or both A and B unless expressly stated otherwise, and "C to D" refers to C or greater and D or smaller unless expressly stated otherwise.

For convenience of description, a direction that goes along a lengthwise direction of a winding axis of an electrode assembly wound in a roll shape is herein referred to as an axis direction Y. Additionally, a direction around the winding axis is herein referred to as a circumferential or peripheral direction X. Additionally, a direction that gets closer to or faces away from the winding axis is referred to as a radial direction or a radiating direction Z. Among them, in particular, the direction that gets closer to the winding axis is referred to as a centripetal direction, and the direction that faces away from the winding axis is referred to as a centrifugal direction.

Hereinafter, a preferred embodiment of the present disclosure will be described with reference to the accompanying drawings.

The fixing structure of an electrode terminal 50 according to the present disclosure may be applied to the structure of a cylindrical battery housing H.

The cylindrical battery housing H may include a cylindrical sidewall 51 and a bottom 52 connected to an end of the sidewall 51. Accordingly, the cylindrical battery housing H may have a structure in which one side is open and the other side is blocked by the bottom 52.

An electrode assembly 71 may be inserted into the battery housing H through one open side of the battery housing H, until the front end of the electrode assembly 71 (the end of the electrode assembly inserted first) reaches the bottom 52 of the battery housing H.

A perforation hole 53 is formed in the bottom 52 of the battery housing H.

The bottom 52 includes a first surface 52a and a second surface 52b that face each other, and the perforation hole 53 is a hole formed to penetrate the bottom 52 so that the first space facing the first surface 52a and the second space facing the second surface 52b communicate with each other.

The first surface 52a may be a surface exposed to the outside of the battery housing H, and thus the first space may be an outer space of the battery housing H. The second surface 52b may be a surface facing the inside of the battery housing H, and thus the second space may be an inner space of the battery housing H.

Conversely, the second surface 52b may be a surface exposed to the outside of the battery housing H, and the first surface 52a may be an opposite surface facing the inside of the battery housing H. Of course, in this case, the second space may be an outer space of the battery housing H, and the first space may be an inner space of the battery housing H.

The first surface 52a and the second surface 52b correspond to the outer surface and the inner surface of the bottom 52 of the battery housing H, respectively.

The perforation hole 53 may be provided near the center of the bottom 52 of the battery housing H.

Before accommodating the electrode assembly 71 in the battery housing H, the electrode terminal 50 is first inserted into the perforation hole 53, and the electrode terminal 50 is fixed to the bottom 52 of the battery housing H.

For example, the electrode terminal 50 may be fixed by a plastic processing portion $50c_1$ formed by plastic processing. The plastic processing may include riveting, caulking, or the like.

Figure 14:
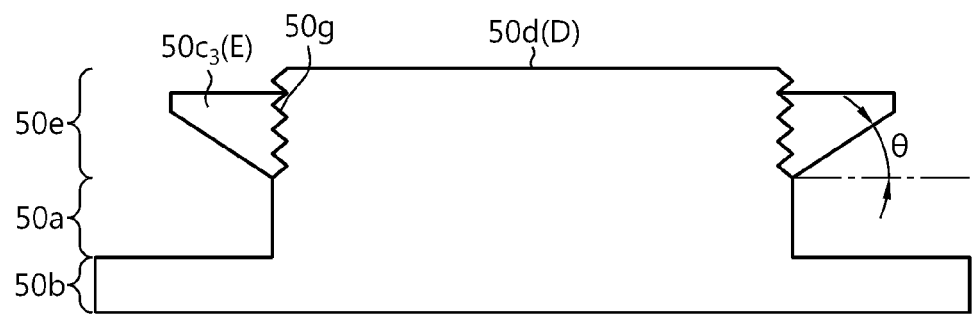
FIG. 14 is an enlarged view showing a modification of the electrode terminal of the second embodiment.

As another example, the electrode terminal 50 may be fixed through a separate fastening member $50c_2$ (FIG. 10) or $50c_3$ (FIG. 14). The fastening member $50c_2$, $50c_3$ may include a nut, a snap ring, or the like.

Figure 6:
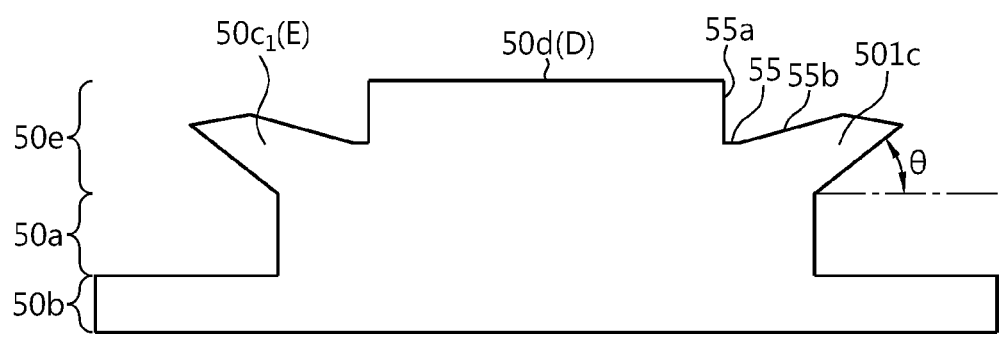
FIG. 6 is an enlarged view showing only the electrode terminal in FIG. 5.

As shown in FIG. 6, the electrode terminal 50 includes a neck portion 50a having a cross section smaller than the cross section of the perforation hole 53, and a head portion 50b provided at one end of the neck portion 50a and having a cross section larger than the cross section of the perforation hole 53. A protrusion 50e having a cross section smaller than the cross section of the perforation hole 53 is provided at the other end of the neck portion 50a.

After the protrusion 50e of the electrode terminal 50 is inserted through the perforation hole 53 on the first surface 52a of the bottom 52 of the battery housing H, the edge of the protrusion 50e may be plastically processed on the second surface 52b of the bottom 52 of the battery housing H to form the plastic processing portion $50c_1$, or the fastening member $50c_2$ or $50c_3$ (FIG. 14) may be physically fixed to the protrusion 50e.

The plastic processing portion $50c_1$ or the fastening member $50c_2$, $50c_3$ forms a diameter-enlarged portion E that expands the cross-sectional area of the protrusion 50e. Accordingly, the cross section of the protrusion 50e becomes larger than the cross section of the perforation hole 53, and the electrode terminal 50 maintain a state of being inserted into and fixed to the perforation hole 53.

The electrode terminal 50 may be inserted from the outside of the battery housing H through the perforation hole 53 provided in the bottom 52, and inside the battery housing H, the protrusion 50e may be plastically processed or the fastening member $50c_2$, $50c_3$ may be fixed to the protrusion 50e. Then, the head portion 50b of the electrode terminal 50 may be exposed to the outside of the battery housing H, and the protrusion 50e of the electrode terminal 50 may be disposed inside the battery housing H.

Alternatively, the electrode terminal 50 may be inserted through the perforation hole 53 provided in the bottom 52 from the inside of the battery housing H, and outside the battery housing H, the protrusion 50e may be plastically processed or the fastening member $50c_2$, $50c_3$ may be fixed. Then, the head portion 50b of the electrode terminal 50 may be disposed inside the battery housing H, and the protrusion 50e of the electrode terminal 50 may be exposed to the outside of the battery housing H.

A surface (a surface exposed in an axial direction) of the head portion 50b of the electrode terminal 50 may have a flat area. The flat area may provide a connecting surface for a bus bar or the like.

In one embodiment, the cross section of the protrusion 50e of the electrode terminal 50 may be expanded by riveting.

The protrusion 50e of the electrode terminal 50 may include a plastic processing portion $50c_1$ formed by plastic deformation by riveting and a front end surface 50d provided at a front end of the protrusion 50e.

The plastic processing portion $50c_1$ may constitute a diameter-enlarged portion E.

The front end surface 50d may be disposed more centripetally (inward in a radial direction) than the plastic processing portion $50c_1$.

The front end surface 50d may include a flat portion D having a flat surface.

The front end surface 50d may form a flat portion D that is flat as a whole.

The front end surface 50d may be a surface already formed before riveting is performed. That is, the front end surface 50d may be an area not deformed by the riveting.

The front end surface 50d may have a surface that protrudes more in the axial direction than the diameter-enlarged portion E.

The plastic processing portion $50c_1$ may have a first region 501c that gradually moves away from the bottom 52 of the battery housing H as extending in a centrifugal direction from the protrusion 50e.

In the first region 501c, an angle formed by the surface of the plastic processing portion $50c_1$ facing the bottom 52 and the bottom 52 may be greater than 0 degrees and equal to or less than 60 degrees.

Figure 9:
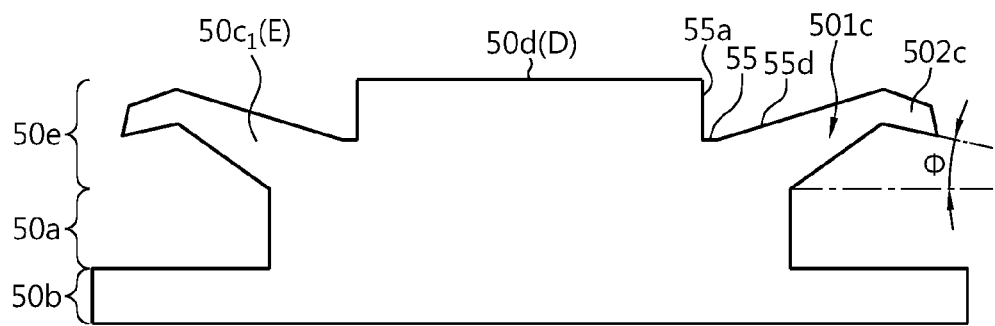
FIG. 9 is an enlarged view showing a modification of the electrode terminal of the first embodiment.

In an embodiment, the plastic processing portion $50c_1$ may include only the first region 501c as shown in FIG. 6. In another embodiment, as shown in FIG. 9, the plastic processing portion $50c_1$ may further include a second region 502c disposed more centrifugally than the first region 501c and connected to the first region 501c. The second region 502c may gradually approach the bottom 52 of the battery housing H as extending in the centrifugal direction.

In the second region 502c, an angle Φ between the surface of the plastic processing portion $50c_1$ facing the bottom 52 and the bottom 52 may be greater than 0 degrees and equal to or less than 30 degrees.

A gutter portion 55 depressed in the axial direction may be provided between the plastic processing portion $50c_1$ and the front end surface 50d. The gutter portion 55 may have a closed loop shape surrounding the front end surface 50d in a circumferential direction.

Preferably, the gutter portion 55 may have a cross-sectional structure of an asymmetric groove. That is, the sidewall surface 55a of the flat portion D and the sidewall surface 55b of the plastic processing portion $50c_1$ may not be parallel to each other.

The gutter portion 55 prevents the external force applied for plastic deformation from affecting the flat portion D when the upper portion of the protrusion 50e is plastically deformed into the diameter-enlarged portion E through riveting. Therefore, the size and shape of the flat portion D may be maintained even after riveting.

A sidewall surface 55a connecting the bottom of the gutter portion 55 and the flat portion D may be perpendicular to a plane including the flat portion D. Accordingly, the area of the flat region of the flat portion D may be secured as much as possible.

A sidewall surface 55b of the plastic processing portion 50$c_1$ facing the sidewall surface 55a of the flat portion D may form an inclined surface.

Preferably, the thickness of the enlarge-diameter portion E may decrease as being away from the protrusion 50e.

In another embodiment, the cross section of the protrusion 50e of the electrode terminal 50 may be expanded by physical coupling of the fastening member 50$c_2$, 50$c_3$.

Figure 10:
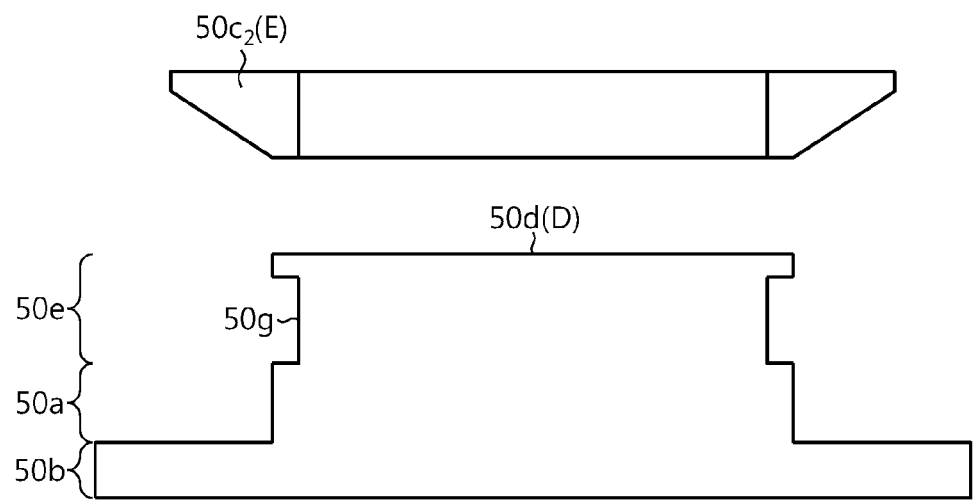
FIGS. 10 and 11 are enlarged views showing an electrode terminal of the second embodiment.

Referring to FIG. 10, the outer circumference of the protrusion 50e of the electrode terminal 50 may have a fastening groove 50g formed to extend along the circumferential direction. The fastening groove 50g may have a groove shape in which the cross section of the protrusion 50e is reduced. That is, the fastening groove 50g may be depressed in the centripetal direction from the outer circumference of the protrusion 50e.

Figure 11:
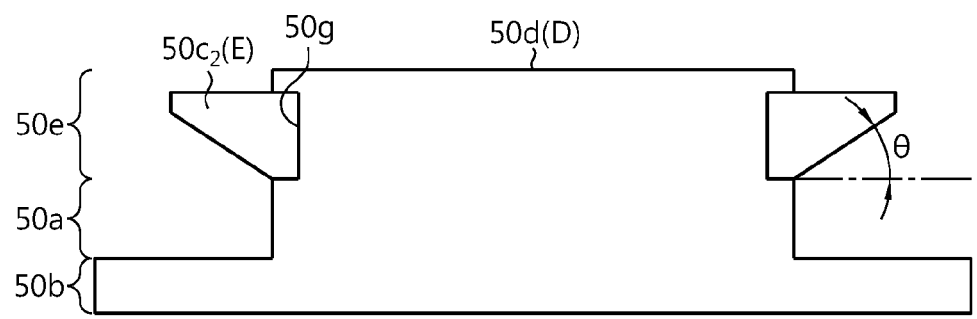

Referring to FIG. 11, as the fastening member 50$c_2$ is inserted into and fixed to the fastening groove 50g, the protrusion 50e is integrated with the fastening member 50$c_2$, and thus the cross section may be enlarged in the upper region of the protrusion 50e. That is, the fastening member 50$c_2$ may form the diameter-enlarged portion E of the protrusion 50e after being fastened with the protrusion 50e. In one example, the fastening groove 50g may be an O-shaped groove, and the fastening member 50$c_2$ may be a C-shaped ring fitted into the O-shaped groove.

Referring to FIG. 14, the fastening groove 50g may have a male thread shape, and the fastening member 50$c_3$ may be a nut having a female thread.

The surface of the fastening members 50$c_2$, 50$c_3$ facing the bottom 52 of the battery housing H may include a shape gradually getting farther away from the bottom 52 as it goes outward in a radial direction.

Referring to FIGS. 11 and 14, the front end surface 50d of the protrusion 50e has a flat portion D, and the flat portion D may maintain a size and shape without being affected by fastening of the fastening members 50$c_2$, 50$c_3$.

A terminal gasket 54 may be interposed between the electrode terminal 50 and the bottom 52 of the battery housing H.

The terminal gasket 54 may be interposed between the head portion 50b of the electrode terminal 50 and the bottom 52, between the neck portion 50a of the electrode terminal 50 and the inner circumference of the perforation hole 53, and between the diameter-enlarged portion E of the protrusion 50e of the electrode terminal 50 and the bottom 52. Accordingly, the terminal gasket 54 may insulate the electrode terminal 50 and the bottom 52 and provide airtightness of the battery housing H.

The sidewall surface (surface facing the bottom 52) of the plastic processing portion 50$c_1$ or the fastening member 50$c_2$, 50$c_3$ compresses the terminal gasket 54 and further pulls the head portion 50b toward the first surface 52a of the bottom 52. Accordingly, a portion of the terminal gasket 54 interposed between the head portion 50b and the first surface 52a of the bottom 52 is strongly compressed.

In addition, the sidewall surface (a surface facing the bottom 52) of the plastic processing portion 50$c_1$ or the fastening member 50$c_2$, 50$c_3$ strongly compresses the terminal gasket 54 at the corner where the inner circumference of the perforation hole 53 and the second surface 52b of the bottom 52 are connected.

Figure 12:
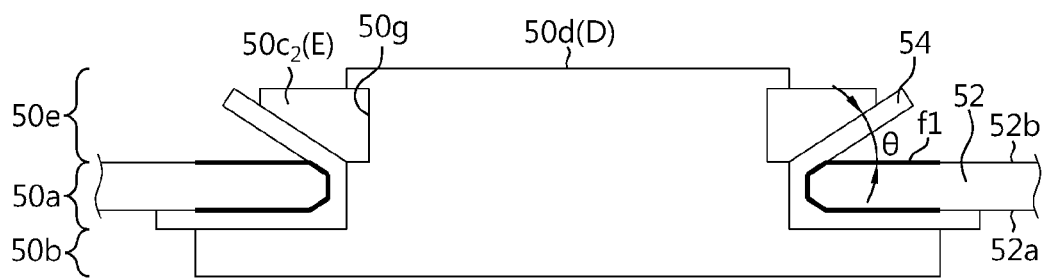
FIGS. 12 and 13 are cross-sectional views showing a case where a sealing coating layer is applied to a fixing structure of the electrode terminal, which includes the electrode terminal of the second embodiment.
Figure 15:
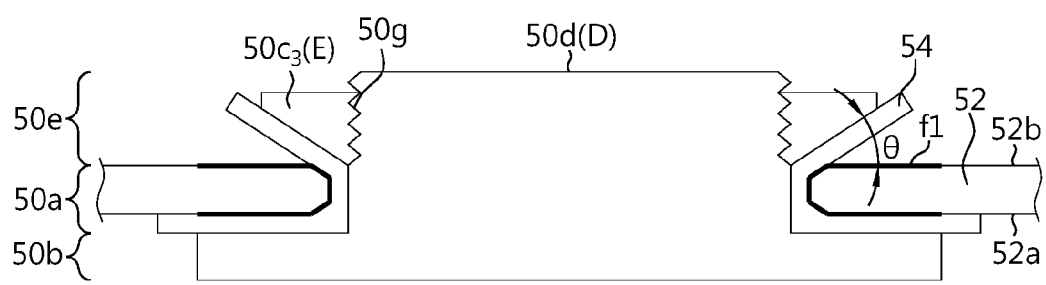
FIGS. 15 and 16 are cross-sectional views showing a case where the sealing coating layer is applied to a fixing structure of the electrode terminal, which includes the electrode terminal according to a modification of the second embodiment.

Referring to FIGS. 12 and 15, the fixing structure of the electrode terminal 50 according to an embodiment of the present disclosure may include a first sealing coating layer $f_1$ formed between the terminal gasket 54 and the bottom 52 of the battery housing H. The first sealing coating layer $f_1$ may be interposed between the terminal gasket 54 and the bottom 52 of the battery housing H to improve sealing performance of the terminal gasket 54.

Figure 13:
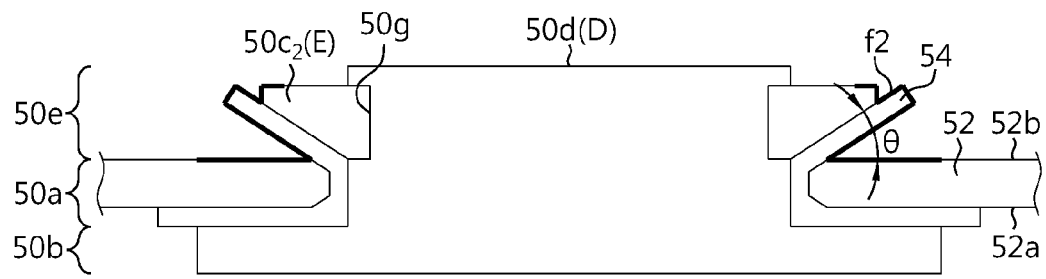
Figure 16:
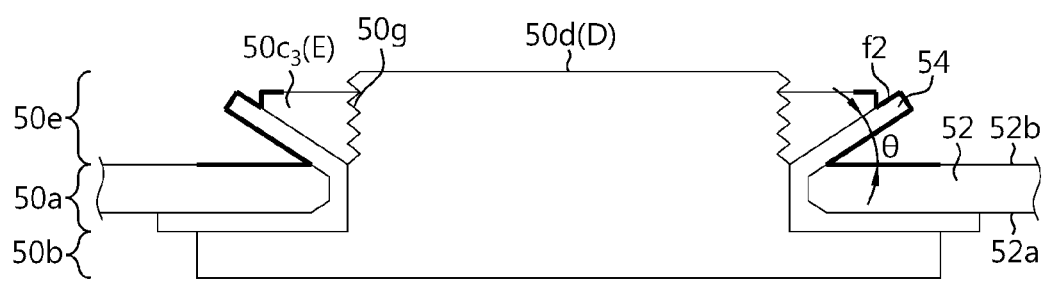

Referring to FIGS. 13 and 16, the fixing structure of the electrode terminal 50 according to an embodiment of the present disclosure may include a second sealing coating layer $f_2$ that covers the external exposure interface between the terminal gasket 54 and the bottom 52 of the battery housing H and/or the external exposure interface between the fastening members 50$c_2$, 50$c_3$ and the terminal gaskets 54. The second sealing coating layer $f_2$ may improve the sealing performance of the terminal gasket 54, like the first sealing coating layer $f_1$.

In the present disclosure, it will be understood by those skilled in the art that the first sealing coating layer $f_1$ and/or the second sealing coating layer $f_2$ are not essential elements but optional elements.

The first sealing coating layer $f_1$ and/or the second sealing coating layer $f_2$ may be made of a material that has excellent sealing properties and is resistant to electrolytes. A silicone resin, silicone acrylate, or polyamideimide may be used as a material for the sealing coating layer $f_1$, $f_2$, but the present disclosure is not limited thereto.

Hereinafter, an embodiment of the present disclosure will be described in more detail.

The cylindrical battery according to the first embodiment of the present disclosure may include an electrode terminal riveted to the bottom of the battery housing.

Figure 5:
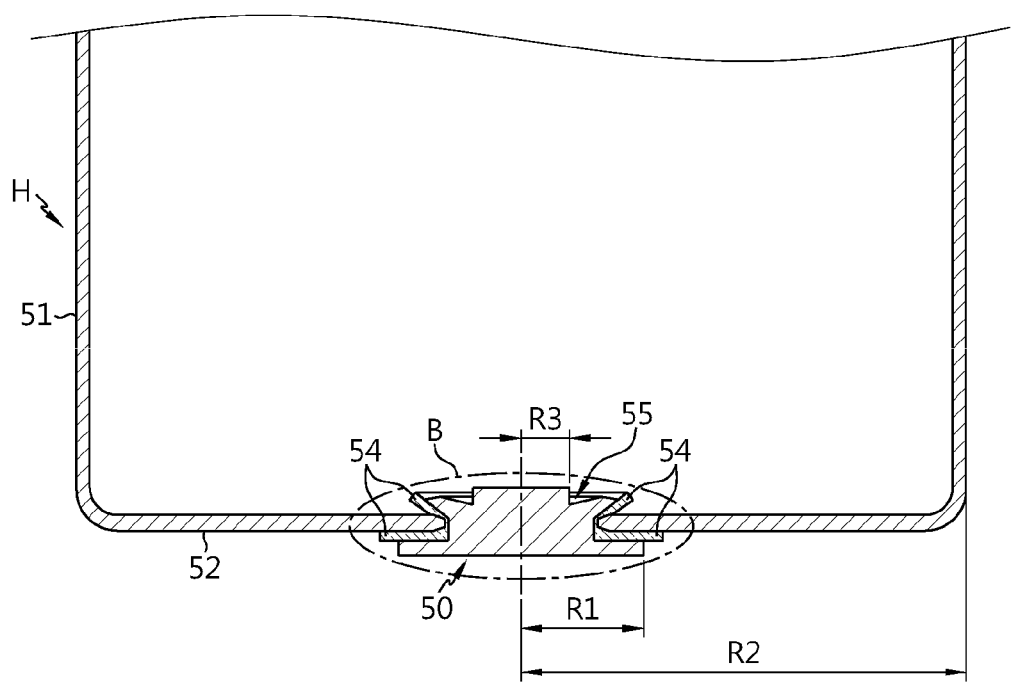
FIG. 5 is a sectional view showing a fixing structure of an electrode terminal according to the first embodiment of the present disclosure.
Figure 7:
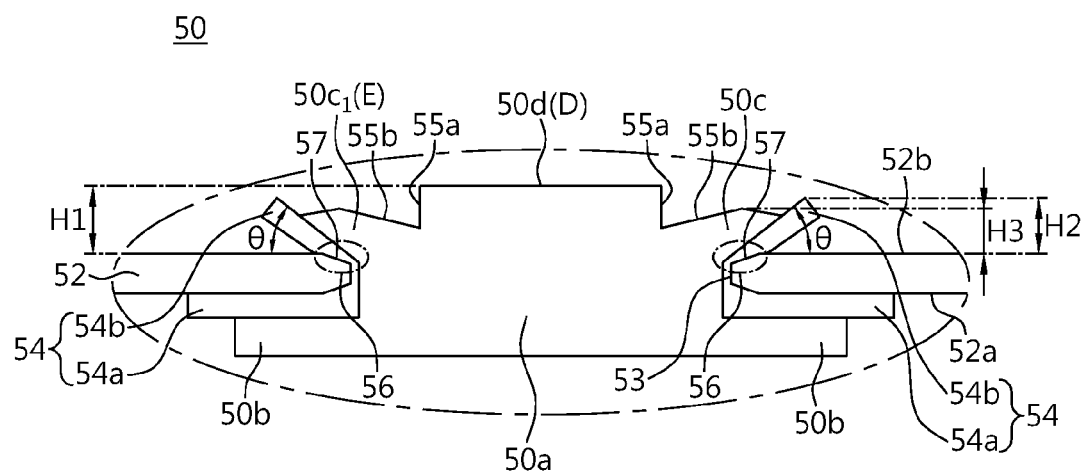
FIG. 7 is an enlarged cross-sectional view showing a portion indicated by a dotted circle in FIG. 5.

FIG. 5 is a sectional view showing a riveting structure of the electrode terminal 50 according to an embodiment of the present disclosure, FIG. 6 is an enlarged view showing only the electrode terminal 50, and FIG. 7 is an enlarged cross-sectional view showing a portion indicated by a dotted circle in FIG. 5.

Referring to FIGS. 5, 6 and 7, the riveting structure of the electrode terminal 50 according to the embodiment may include a cylindrical battery housing H having one side open, an electrode terminal 50 riveted through the perforation hole 53 formed in the bottom 52 of the battery housing H, and a terminal gasket 54 interposed between the electrode terminal 50 and the perforation hole 53.

The battery housing H is made of a conductive metal material. In one example, the battery housing H may be made of steel or aluminum, but the present disclosure is not limited thereto. The battery housing H includes a cylindrical sidewall 51 and a bottom 52 connected to an end of the sidewall. The bottom 52 may be integrally formed with the sidewall 51. For example, in the battery housing H, the sidewall 51 and the bottom 52 may be integrally formed by drawing a sheet metal with a press.

The perforation hole 53 formed in the bottom 52 may be manufactured by forming the sidewall 51 and the bottom 52 and then drilling the bottom 52.

The electrode terminal 50 is made of a conductive metal material. In one example, the electrode terminal 50 may be made of aluminum or steel, but the present disclosure is not limited thereto.

The terminal gasket 54 may be made of a polymer resin having insulation and elasticity properties. In one example, the terminal gasket 54 may be made of polypropylene, polybutylene terephthalate, polyfluorinated ethylene, or the like, but the present disclosure is not limited thereto.

Preferably, the electrode terminal 50 includes a neck portion 50a inserted into the perforation hole 53, a head portion 50b exposed through the outer surface 52a of the bottom 52, and a protrusion 50e exposed through the inner surface 52b of the bottom 52 of the battery housing H and extended in the axial direction.

The head portion 50b may extend further outward in a radial direction than the neck portion 50a. The diameter of the head portion 50b may be greater than the diameter of the perforation hole 53.

The protrusion 50e may include a diameter-enlarged portion E extending outward in a radial direction from its circumference, and a flat portion D provided inside the diameter-enlarged portion E in a radial direction.

The diameter-enlarged portion E may be formed through a molding process that causes plastic deformation to spread a top edge portion of the protrusion 50e having a smaller size than the perforation hole 53 outward in a radial direction. That is, the diameter-enlarged portion E may be the plastic processing portion $50c_1$.

In one example, the plastic processing portion $50c_1$ may be formed by a riveting process using a caulking jig. After riveting, the diameter of the diameter-enlarged portion E is enlarged more than the diameter of the perforation hole 53.

The front end surface 50d of the protrusion 50e is a surface provided at an end of the protrusion 50e, and may provide a flat portion D facing the axial direction.

Preferably, the flat portion D and the inner surface 52b of the bottom 52 of the battery housing H may be parallel to each other. Here, 'parallel' means substantially parallel when observed with the naked eye.

According to an embodiment, the diameter-enlarged portion E may include a first region 501c that is gradually farther away from the inner surface 52b as going in the centrifugal direction, as shown in FIG. 6. An angle θ between the surface of the first region 501c of the diameter-enlarged portion E facing the bottom 52 and the inner surface 52b of the bottom 52 may be 0 degrees or more and 60 degrees or less.

The size of the angle θ is determined by the riveting strength when the electrode terminal 50 is installed in the perforation hole 53 of the battery housing H by the riveting method. In one example, the angle θ may decrease to 0 degree as the riveting strength increases. If the angle exceeds 60 degrees, the sealing effect of the terminal gasket 54 may deteriorate.

According to another embodiment, the diameter-enlarged portion E may be a shape including a first region 501c that is gradually farther away from the inner surface 52b as going in the centrifugal direction, as shown in FIG. 9, and a second region 502c connected to the centrifugal end of the first region 501c and gradually approaching the inner surface 52b as going in the centrifugal direction. An angle Φ between the surface of the second region 502c of the diameter-enlarged portion E facing the bottom 52 and the inner surface 52b of the bottom 52 may be greater than 0 degrees and equal to or less than 30 degrees.

The second region 502c may be molded again after the first region 501c is molded.

The second region 502c presses the terminal gasket 54 so that the terminal gasket 54 may lie along the bottom 52 without being excessively erected from the inner surface 52b of the bottom 52. If the angle exceeds 30 degrees, the boundary portion between the first region 501c and the second region 502c may be excessively plastically deformed.

The second region 502c provides a structure in which the diameter-enlarged portion E does not protrude further than the flat portion D in the axial direction. Then, the height of the flat portion D protruding in the axial direction is reduced as much as possible, thereby increasing the utilization efficiency of the inner space of the battery housing H.

The front end surface 50d may protrude more in the axial direction than the diameter-enlarged portion E.

According to another embodiment, a gutter portion 55 may be provided between the diameter-enlarged portion E and the flat portion D. The gutter portion 55 may have a cross-sectional structure of an asymmetric groove. In one example, the asymmetrical groove may have an approximately "V" to "U" shape. The asymmetrical groove may include a sidewall surface 55a at the flat portion D and a sidewall surface 55b at the diameter-enlarged portion E facing the sidewall surface 55a. The sidewall surface 55a may be substantially perpendicular to the inner surface 52b of the bottom 52 of the battery housing H. The term 'vertical' means substantially vertical when observed with the naked eye. The gutter portion 55 may be made by the shape of the caulking jig when the electrode terminal 50 is installed in the perforation hole 53 of the battery housing H.

Preferably, the thickness of the diameter-enlarged portion E may gradually decrease toward the outer side in the radial direction. This thickness reduction structure provides a compact structure that sufficiently compresses the terminal gasket 54 in the centripetal direction of the diameter-enlarged portion E and prevents the centrifugal end of the diameter-enlarged portion E from protruding beyond the flat portion D. Then, the height of the flat portion D protruding in the axial direction may be made as low as possible, thereby increasing the utilization efficiency of the inner space of the battery housing.

According to another embodiment, the terminal gasket 54 may include an outer gasket 54a interposed between the head portion 50b and the outer surface 52a of the bottom 52, and an inner gasket 54b interposed between the diameter-enlarged portion E and the inner surface 52b of the bottom 52.

Referring to FIG. 7, the outer gasket 54a and the inner gasket 54b may have different thicknesses depending on positions. Preferably, the thickness of a region of the inner gasket 54b interposed between the inner edge 56 of the perforation hole 53 connected to the inner surface 52b of the bottom 52 of the battery housing H and the diameter-enlarged portion E may be relatively small. Preferably, a minimum thickness point may exist in a gasket region interposed between the inner edge 56 of the perforation hole 53 and the diameter-enlarged portion E. In addition, the inner edge 56 of the perforation hole 53 may include a facing surface 57 that faces the diameter-enlarged portion E. The facing surface 57 functions as a chamfer to prevent the pressure of the diameter-enlarged portion E pressing the terminal gasket 54 from being excessively concentrated on the inner edge 56.

Meanwhile, the upper and lower ends of the inner circumferential wall of the perforation hole 53 perpendicular to the bottom 52 are chamfered (corner-cut) to form a tapered surface toward the electrode terminal 50. However, it is also possible that the upper end and/or the lower end of the inner wall of the perforation hole 53 may be formed with a smooth curved surface having curvature. In this case, the stress applied to the terminal gasket 54 near the upper end and/or the lower end of the inner wall of the perforation hole 53 may be more alleviated.

The inner gasket 54b may extend longer than the diameter-enlarged portion E while forming an angle of 0 to 60 degrees with the inner surface 52b of the bottom 52 of the battery housing H. Accordingly, it is possible to prevent the centrifugal end of the diameter-enlarged portion E from contacting the bottom 52 of the battery housing H.

In another embodiment, the height H1 of the flat portion D may be equal to or greater than the height H2 of the end of the inner gasket 54b based on the inner surface 52b of the bottom 52 of the battery housing H. In addition, the height H1 of the flat portion D may be equal to or greater than the height H3 of the end of the diameter-enlarged portion E based on the inner surface 52b of the bottom 52 of the battery housing H.

When the height parameters H1, H2, and H3 satisfy the above conditions, it is possible to prevent the diameter-enlarged portion E and the inner gasket 54b from interfering with other components (e.g., a second current collector, explained later).

Referring to FIG. 5, a radius R1 from the center of the electrode terminal 50 to the edge of the head portion 50b may be 10% to 60% based on the radius R2 of the bottom 52.

If R1 is small, the welding space becomes insufficient when welding an electric wiring component (bus bar) to the electrode terminal 50. In addition, if R1 increases, the welding space decreases when welding the electric wiring component (bus bar) to the outer surface 52a of the bottom 52 of the battery housing H, except for the electrode terminal 50.

If the ratio R1/R2 is adjusted between 10% and 60%, it is possible to properly secure the welding space for the electrode terminal 50 and the outer surface of the bottom 52.

In addition, a radius R3 from the center of the electrode terminal 50 to the edge of the flat portion D may be 4% to 30% based on the radius R2 of the bottom 52.

If R3 is small, when welding the current collector 79 (FIG. 8) to the flat portion D of the electrode terminal 50, the welding space becomes insufficient, and the welding area of the electrode terminal 50 decreases, so that the contact resistance may increase.

In addition, in order to insert the electrode terminal 50 into the perforation hole 53, R3 has to be smaller than the radius of the perforation hole 53. Within these constraints, as R3 increases, the diameter-enlarged portion E has a smaller thickness as much, so that the force of the diameter-enlarged portion E to compress the terminal gasket 54 is weakened, thereby deteriorating the sealing ability of the terminal gasket 54.

Figure 8:
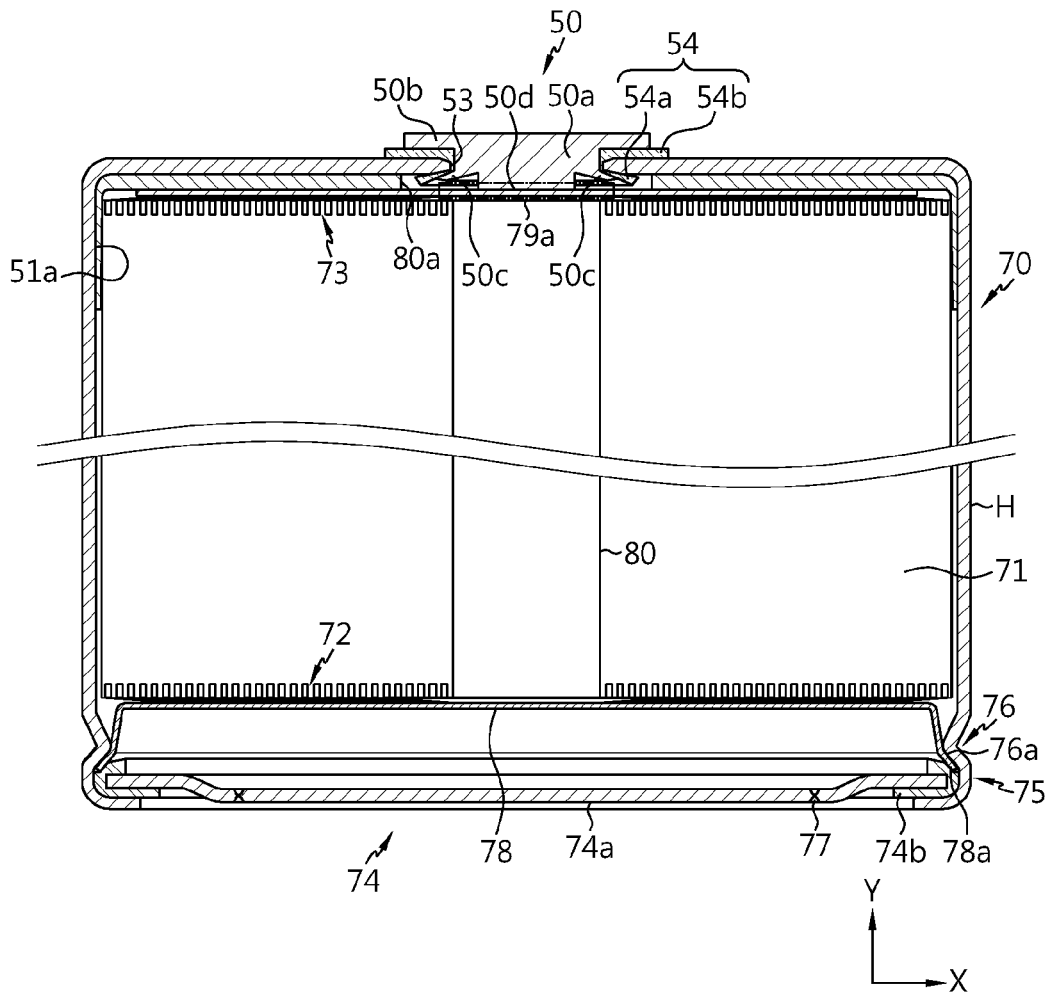
FIG. 8 is a cross-sectional view showing a cylindrical battery according to an embodiment of the present disclosure, taken along a Y-Z plane.

If R3/R2 is adjusted between 4% and 30%, as shown in FIG. 8, the welding process may be easily performed by securing a sufficient welding area between the flat portion D of the electrode terminal 50 and the current collector 79, and it is possible to reduce the contact resistance of the welding region and prevent the degradation of the sealing ability of the terminal gasket 54.

According to an embodiment of the present disclosure, the riveting structure of the electrode terminal 50 may be formed using a caulking jig that moves up and down. First, a pre-form (not shown) of the electrode terminal 50 is inserted into the perforation hole 53 formed in the bottom 52 of the battery housing H with the terminal gasket 54 interposed therebetween. The pre-form refers to an electrode terminal before being riveted.

Next, the caulking jig is inserted into the inner space of the battery housing H. The caulking jig has a groove and a protrusion corresponding to the final shape of the electrode terminal 50 on a surface facing the pre-form in order to form the electrode terminal 50 by riveting the pre-form.

Next, the caulking jig is moved downward to perform press-forming to the upper part of the pre-form, so that the pre-form is plastically deformed into the riveted electrode terminal 50.

The press-fit depth of the caulking jig may be regulated by the front end surface 50d. Accordingly, the shape of the diameter-enlarged portion E, which is plastically deformed even in the mass production process, may be uniformly controlled.

Also, the front end surface 50d is not deformed or hardly deformed during the press-fitting process using the caulking jig. Therefore, the front end surface 50d may also maintain a uniform shape during mass production. This makes it easier to weld the front end surface 50d and the current collector 79 (FIG. 8), and accordingly, manufacturing deviation can be remarkably reduced.

While the pre-form is being pressed by the caulking jig, the outer gasket 54a interposed between the head portion 50b and the outer surface 52a of the bottom 52 is elastically compressed, so that its thickness is reduced. In addition, a portion of the inner gasket 54b interposed between the inner edge 56 of the perforation hole 53 and the pre-form is elastically compressed by the diameter-enlarged portion E, so that the thickness is further reduced than other areas. In particular, the region of the inner gasket 54b where the thickness is intensively reduced is a portion indicated by a dashed-dotted circle in FIG. 7. Accordingly, the sealing and airtightness between the riveted electrode terminal 50 and the battery housing H are remarkably improved.

Preferably, the terminal gasket 54 is compressed sufficiently to secure a desired sealing strength without being physically damaged in the process of riveting the pre-form.

In one example, when the terminal gasket 54 is made of polybutylene terephthalate, it is preferable that the terminal gasket 54 has a compression ratio of 50% or more at the point where the terminal gasket 54 is compressed to a minimum thickness. The compression ratio is a ratio of thickness change before and after compression with regard to the thickness before compression.

In another example, when the terminal gasket 54 is made of polyfluoroethylene, it is preferable that the terminal gasket 54 has a compression ratio of 60% or more at the point where the terminal gasket 54 is compressed to a minimum thickness.

In still another example, when the terminal gasket 54 is made of polypropylene, it is preferable that the terminal gasket 54 has a compression ratio of 60% or more at the point where the terminal gasket 54 is compressed to a minimum thickness.

Preferably, press-forming may be performed in multiple stages to the upper portion of the pre-form by vertically moving the caulking jig at least two times. That is, the pre-form may be plastically deformed several times by performing press-forming in multiple stages. At this time, the pressure applied to the caulking jig may be increased step by step. In this way, the stress applied to the pre-form is dispersed several times, thereby preventing the terminal gasket 54 from being damaged during the caulking process. In particular, when the region of the inner gasket 54b interposed between the inner edge 56 of the perforation hole 53 and the pre-form is intensively compressed by the diameter-enlarged portion E, the damage to the gasket is minimized by performing press-forming in multiple stages.

After the press-forming is completely performed to the pre-form using the caulking jig, if the caulking jig is separated from the battery housing H, the fixing structure of the electrode terminal 50 according to an embodiment of the present disclosure may be obtained as shown in FIG. 7.

According to the above embodiment, the caulking jig performs press-forming to the upper portion of the pre-form by vertical movement inside the battery housing H. In some cases, a rotary jig used in the prior art may be used for performing press-forming to the pre-form.

However, the rotary jig rotates in a state of being inclined at a predetermined angle with respect to the central axis of the battery housing H. Therefore, the rotary jig with a large rotation radius may interfere with the inner wall of the battery housing H. In addition, if the battery housing H has a large depth, the length of the rotary jig is also increased. In this case, as the rotation radius of the end of the rotary jig increases, press-forming may not be performed properly to the pre-form. Therefore, it is more effective to perform press-forming using a caulking jig rather than using a rotary jig.

The diameter-enlarged portion E may not only be formed through the plastic processing described above, but may also be formed using a physical fastening member $50c_2$, $50c_3$.

Referring to FIGS. 10 and 11, the cross section of the protrusion 50e of the electrode terminal 50 may be expanded in the axial direction by the coupling of the fastening member $50c_2$. The fastening member $50c_2$ may be a C-shaped snap ring.

The outer circumference of the protrusion 50e of the electrode terminal 50 may have a fastening groove 50g extending along the circumferential direction. The fastening groove 50g may have an annular groove shape in which the cross section of the protrusion 50e is reduced.

As shown in FIG. 10, the fastening member $50c_2$ may be press-fitted from the front end surface 50d of the protrusion 50e and fitted into the fastening groove 50g. In this process, the C-shaped snap ring may be elastically deformed to expand its radius, and when it is inserted into the fastening groove 50g, it may be elastically restored to reduce its radius again and firmly fastened to the fastening groove 50g.

When the fastening member $50c_2$ is inserted into and fixed to the fastening groove 50g, the fastening member $50c_2$ is integrated with the protrusion 50e. Accordingly, the protrusion 50e may have a structure in which the cross section in the radial direction is further expanded along the axial direction. That is, the fastening member $50c_2$ may form a diameter-enlarged portion E of the protrusion 50e after being fastened with the protrusion 50e.

The surface of the fastening member $50c_2$ facing the bottom 52 has a shape that is farther away from the bottom 52 as it goes outward in the radial direction. Accordingly, the fastening member $50c_2$ has a structure inclined at a predetermined angle θ with respect to the bottom 52, like the first region 501c of the plastic processing portion $50c_1$.

Referring to FIGS. 12 and 13, in order to enhance sealing performance of the electrode terminal 50, a first sealing coating layer $f_1$ may be provided between the terminal gasket 54 and the bottom 52 of the battery housing H. The first sealing coating layer $f_1$ may be formed in advance on the bottom 52 of the battery housing H and the perforation hole 53 before installing the electrode terminal 50 in the perforation hole 53.

Optionally, in order to enhance the sealing property of the electrode terminal 50, a second sealing coating layer $f_2$ may cover the external exposure interface between the terminal gasket 54 and the bottom 52 of the battery housing H and/or the external exposure interface between the fastening member $50c_2$ and the terminal gasket 54. The second sealing coating layer $f_2$ may be formed using a spray coating method after the electrode terminal 50 is completely installed.

In the present disclosure, it will be understood by those skilled in the art that the first sealing coating layer $f_1$ and/or the second sealing coating layer $f_2$ are not essential elements but optional elements.

The first sealing coating layer $f_1$ and/or the second sealing coating layer $f_2$ may be made of a material that has excellent sealing properties and is resistant to electrolytes. A silicone resin, silicone acrylate, or polyamideimide may be used as a material of the sealing coating layer $f_1$, $f_2$, but the present disclosure is not limited thereto.

Referring to FIG. 14, the electrode terminal 50 may include a diameter-enlarged portion E formed by a bolt/nut coupling structure.

Specifically, a fastening groove 50g having a male thread shape may be formed in the outer circumference of the upper portion of the protrusion 50e of the electrode terminal 50. Also, the fastening member $50c_3$ may be a nut having a female thread formed on the inner circumference.

The surface of the fastening member $50c_3$ having a nut structure, which faces the bottom 52 of the battery housing H, may have a shape gradually getting farther away from the bottom 52 as it goes outward in a radial direction. Therefore, since the fastening member $50c_3$ has a structure inclined at a predetermined angle θ with respect to the bottom 52, like the first region 501c of the plastic processing portion $50c_1$, it is possible to compress the terminal gasket 54 to provide sealing properties.

Also in the second embodiment, the front end surface 50d of the protrusion 50e has a flat portion D. Also, the flat portion D may protrude further in the axial direction than the fastening member $50c_3$. In addition, the flat portion D may also maintain its size and shape without being affected by the fastening of the fastening member $50c_3$.

Referring to FIGS. 15 and 16, in order to enhance sealing performance of the electrode terminal 50, a first sealing coating layer $f_1$ may be provided between the terminal gasket 54 and the bottom 52 of the battery housing H. The first sealing coating layer $f_1$ may be formed in advance on the bottom 52 of the battery housing H and the perforation hole 53 before installing the electrode terminal 50 in the perforation hole 53.

Optionally, in order to enhance the sealing property of the electrode terminal 50, a second sealing coating layer $f_2$ may cover the external exposure interface between the terminal gasket 54 and the bottom 52 of the battery housing H and/or the external exposure interface between the fastening member $50c_3$ and the terminal gasket 54. The second sealing coating layer $f_2$ may be formed using a spray coating method after the electrode terminal 50 is completely installed.

In the present disclosure, it will be understood by those skilled in the art that the first sealing coating layer $f_1$ and/or the second sealing coating layer $f_2$ are not essential elements but optional elements.

The first sealing coating layer $f_1$ and/or the second sealing coating layer $f_2$ may be made of a material that has excellent sealing properties and is resistant to electrolytes. A silicone resin, silicone acrylate, or polyamideimide may be used as a material of the sealing coating layer $f_1$, $f_2$, but the present disclosure is not limited thereto.

The fixing structure of the electrode terminal 50 according to an embodiment of the present disclosure as described above may be applied to a cylindrical battery.

Preferably, the cylindrical battery may be, for example, a cylindrical battery whose form factor ratio (defined as a value obtained by dividing the diameter of the cylindrical battery by height) is greater than about 0.4.

Here, the form factor means a sequence of numbers representing the diameter and height of a cylindrical battery. The cylindrical battery according to an embodiment of the present disclosure may be, for example, a 46110 battery, a 4875 battery, a 48110 battery, a 4880 battery, or a 4680 battery. In the numerical value representing the form factor, first two numbers indicate the diameter of the battery, and the remaining numbers indicate the height of the battery.

A battery according to an embodiment of the present disclosure may be an approximately cylindrical battery, whose diameter is approximately 46 mm, height is approximately 110 mm, and form factor ratio is 0.418.

A battery according to another embodiment may be an approximately cylindrical battery, whose diameter is about 48 mm, height is about 75 mm, and form factor ratio is 0.640.

A battery according to still another embodiment may be an approximately cylindrical battery, whose diameter is approximately 48 mm, height is approximately 110 mm, and form factor ratio is 0.436.

A battery according to still another embodiment may be an approximately cylindrical battery, whose diameter is approximately 48 mm, height is approximately 80 mm, and form factor ratio is 0.600.

A battery according to still another embodiment may be an approximately cylindrical battery, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

FIG. 8 is a cross-sectional view showing a cylindrical battery 70 according to an embodiment of the present disclosure, taken along a plane including an axial direction Y and a radial direction Z.

Referring to FIG. 8, the cylindrical battery 70 according to an embodiment includes a jelly-roll type electrode assembly 71 in which a first electrode and a second electrode having a sheet shape are wound with a separator interposed therebetween, so that an uncoated portion 72 of the first electrode is exposed at a lower portion and an uncoated portion 73 of the second electrode is exposed at an upper portion.

In an embodiment, the first electrode may be a negative electrode and the second electrode may be a positive electrode, or vice versa.

Figure 2:
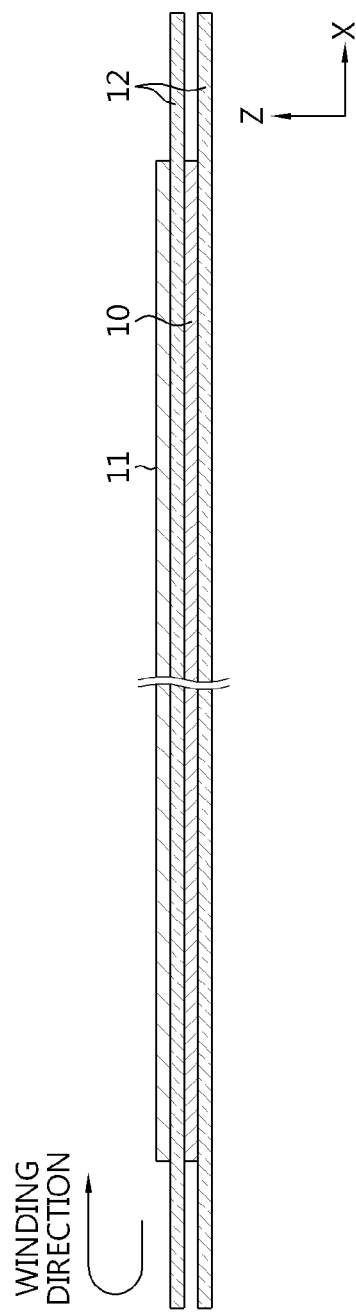
FIG. 2 is a diagram showing a process of winding an electrode assembly included in the conventional tab-less cylindrical battery.
Figure 3:
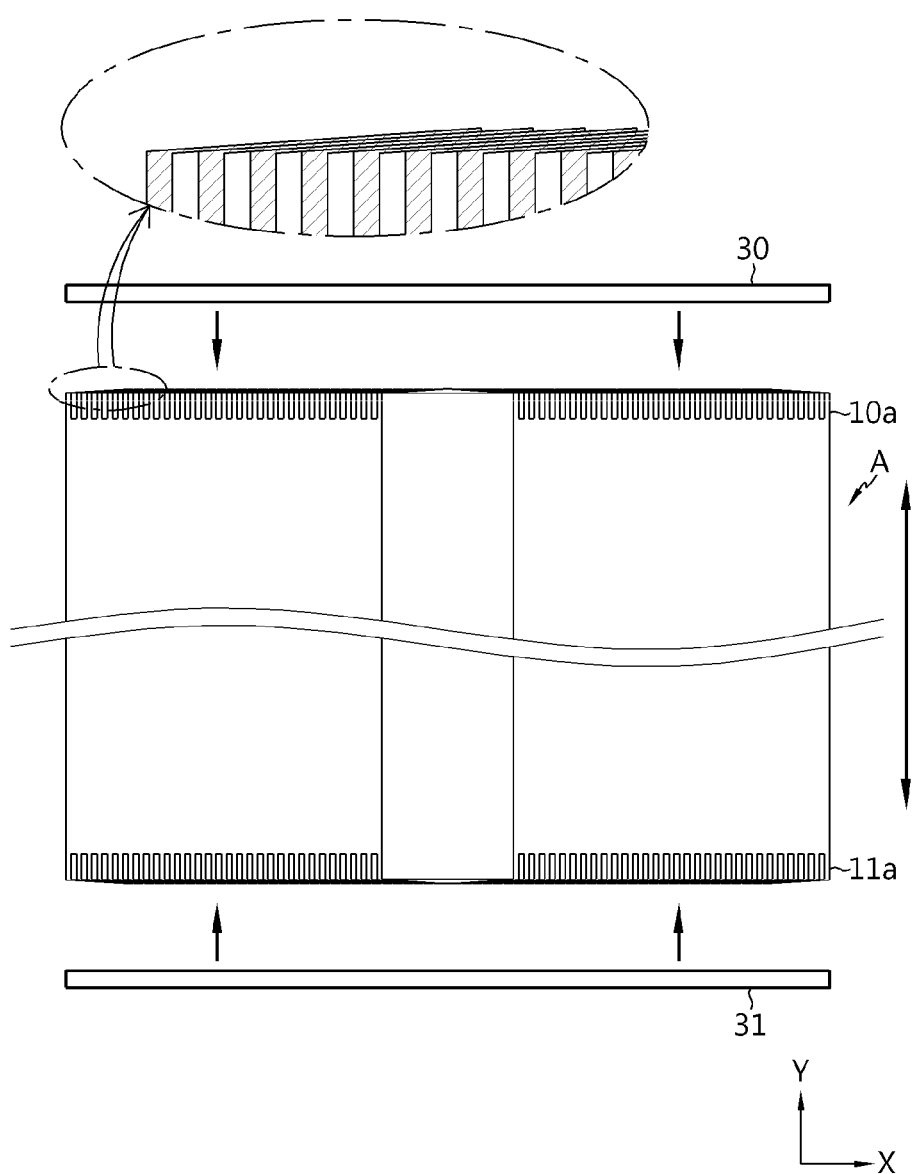
FIG. 3 is a diagram showing a process of welding a current collector to a bent surface of an uncoated portion in the electrode assembly of FIG. 2.
Figure 4:
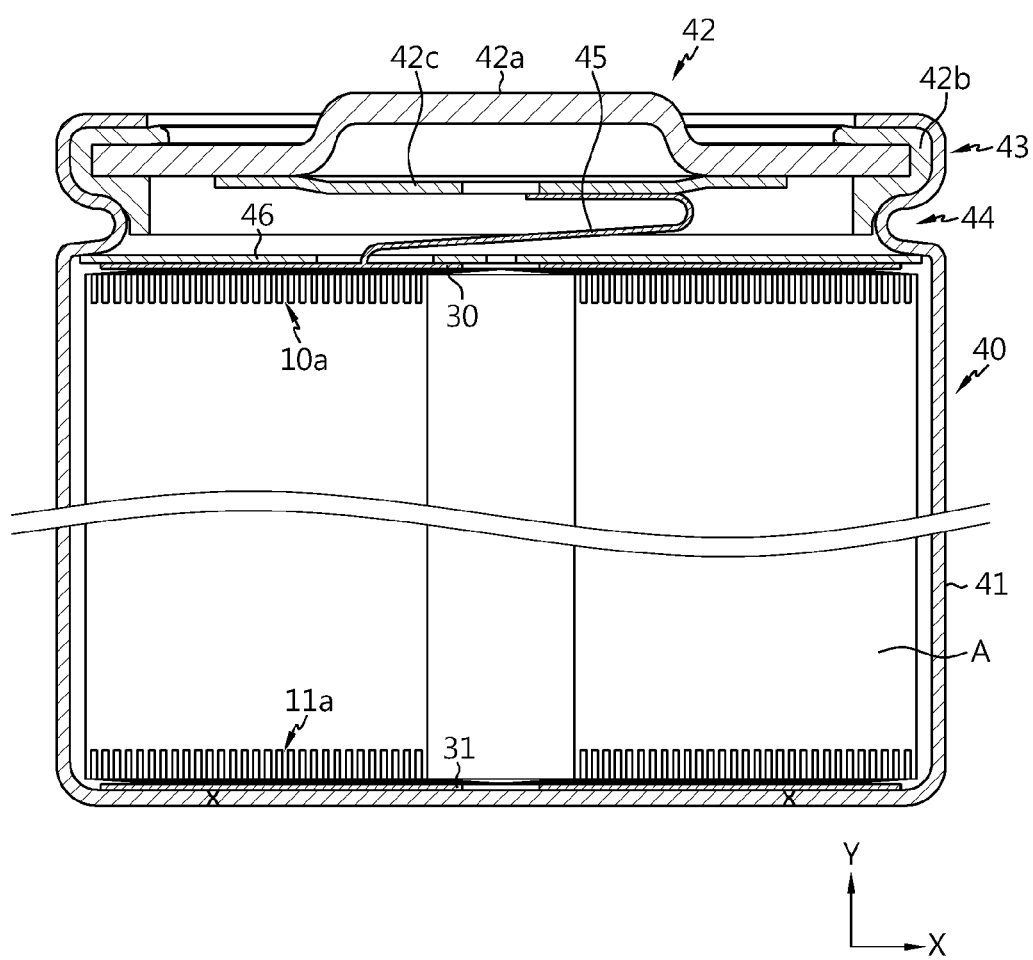
FIG. 4 is a sectional view showing the conventional tab-less cylindrical battery, taken along a longitudinal direction Y.

The method of winding the electrode assembly 71 is substantially the same as the method of winding the electrode assembly used in manufacturing the conventional tab-less cylindrical battery described with reference to FIG. 2.

In depicting the electrode assembly 71, only the uncoated portions 72, 73 extending to be exposed to the outside of the separator are illustrated in detail, and the winding structure of the first electrode, the second electrode and the separator is not illustrated in detail.

The cylindrical battery 70 also includes a cylindrical battery housing H that accommodates the electrode assembly 71 and is electrically connected to the uncoated portion 72 of the first electrode.

Preferably, one side (lower portion) of the battery housing H is open. In addition, the bottom 52 of the battery housing H has a structure in which the electrode terminal 50 is riveted to the perforation hole 53 through a caulking process.

The cylindrical battery 70 may also include a terminal gasket 54 interposed between the electrode terminal 50 and the perforation hole 53.

The cylindrical battery 70 may also include a sealing body 74 that seals the open end of the battery housing H to be insulated from the battery housing H. Preferably, the sealing body 74 may include a cap 74a having no polarity, and a sealing gasket 74b interposed between an edge of the cap 74a and the open end of the battery housing H.

The cap 74a may be made of a conductive metal material such as aluminum, steel, nickel or the like. In addition, the sealing gasket 74b may be made of polypropylene, polybutylene terephthalate, polyethylene fluoride, or the like having insulation and elasticity properties. However, the present disclosure is not limited by the materials of the cap 74a and the sealing gasket 74b.

The cap 74a may include a vent notch 77 that ruptures when the pressure inside the battery housing H exceeds a threshold. The vent notch 77 may be formed at both sides of the cap 74a. The vent notch 77 may form a continuous or discontinuous circular pattern, a straight pattern or any other pattern on the surface of the cap 74a.

The battery housing H may include a crimping portion 75 that is extended and bent into the inside of the battery housing H to surround and fix the edge of the cap 74a together with the sealing gasket 74b in order to fix the sealing body 74.

The battery housing H may also include a beading portion 76 pressed-in into the battery housing H in a region adjacent the open end thereof. The beading portion 76 supports the edge of the sealing body 74, particularly the outer circumferential surface of the sealing gasket 74b, when the sealing body 74 is fixed by the crimping portion 75.

The cylindrical battery 70 may further include a first current collector 78 welded to the uncoated portion 72 of the first electrode. The first current collector 78 is made of a conductive metal material such as aluminum, steel, nickel or the like. Preferably, at least a portion 78a of the edge of the first current collector 78 not in contact with the uncoated portion 72 of the first electrode may be interposed between the beading portion 76 and the sealing gasket 74b and fixed by the crimping portion 75. Optionally, at least a portion 78a of the edge of the first current collector 78 may be fixed to the inner circumference 76a of the beading portion 76 adjacent to the crimping portion 75 by a laser welding, a spot welding, an ultrasonic welding or the like.

The cylindrical battery 70 may also include a second current collector 79 that is welded to the uncoated portion 73 of the second electrode. Preferably, at least a portion of the second current collector 79, for example a central portion 79a thereof, may be welded to the flat portion D of the electrode terminal 50.

Preferably, when the second current collector 79 is welded, a welding tool may be inserted through the cavity 80 in the core of the electrode assembly 71 to reach a welding point of the second current collector 79. In addition, when the second current collector 79 is welded to the flat portion D of the electrode terminal 50, since the electrode terminal 50 supports the welding region of the second current collector 79, it is possible to improve the welding quality by applying a strong pressure to the welding region. In addition, since the flat portion D of the electrode terminal 50 has a large area, a wide welding region may also be secured. Accordingly, the contact resistance of the welding region is lowered, thereby lowering the inner resistance of the cylindrical battery 70. The face-to-face welding structure of the riveted electrode terminal 50 and the second current collector 79 is very useful for rapid charging using high C-rate current. This is because the current density per unit area may be lowered in the cross section in a direction in which the current flows and thus the amount of heat generated in the current path may be lowered than that of the prior art.

When welding the flat portion 50d of the electrode terminal 50 and the second current collector 79, any one of laser welding, ultrasonic welding, spot welding, and resistance welding may be used. The area of the flat portion D may be adjusted differently depending on the welding method, and is preferably 2 mm or more for welding strength and ease of the welding process.

In one example, when the flat portion D and the second current collector 79 are welded with a laser and welded in a continuous or discontinuous line in the form of an arc pattern, the diameter of the flat portion D is preferably 4 mm or more. When the diameter of the flat portion D satisfies the corresponding condition, welding strength may be secured, and there is no difficulty in the welding process by inserting a laser welding tool into the cavity 80 of the electrode assembly 71.

In another example, when the flat portion D and the second current collector 79 are ultrasonically welded and welded in a circular pattern, the diameter of the flat portion D is preferably 2 mm or more. When the diameter of the flat portion D satisfies the corresponding condition, welding strength may be secured, and there is no difficulty in the welding process by inserting an ultrasonic welding tool into the cavity 80 of the electrode assembly 71.

The cylindrical battery 70 may further include an insulator 80. The insulator 80 may be interposed between the second current collector 79 and the inner surface 52a of the bottom 52, and between the inner circumference 51a of the sidewall of the battery housing H and the electrode assembly 71. Preferably, the insulator 80 may have a welding hole 80a that exposes the flat portion D of the electrode terminal 50 toward the second current collector 79, and may cover the surface of the second current collector 79 and an edge of one end (upper portion) of the electrode assembly 71.

Preferably, the uncoated portions 72, 73 of the first electrode and/or the second electrode may be bent from the outer circumference of the electrode assembly 71 toward the core, to form bent surfaces at the upper and lower portions of the electrode assembly 71. In addition, the first current collector 78 may be welded to the bent surface formed by bending the uncoated portion 72 of the first electrode, and the second current collector 79 may be welded to the bent surface formed by bending the uncoated portion 73 of the second electrode.

In order to relieve the stress generated when the uncoated portions 72, 73 are bent, the first electrode and/or the second electrode may have an improved structure different from that of the conventional electrode (see FIG. 1).

Figure 17:
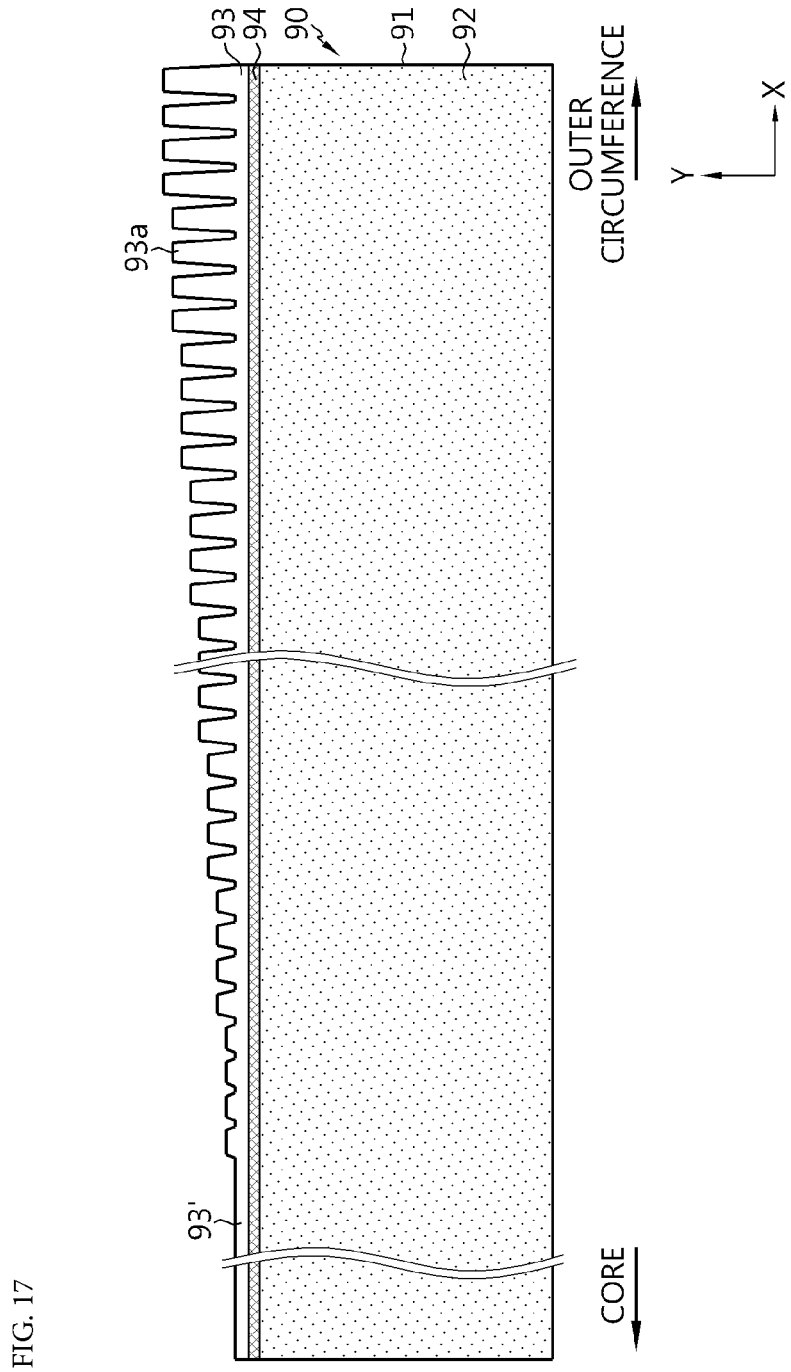
FIG. 17 is a plan view exemplarily showing an electrode structure according to a preferred embodiment of the present disclosure.

FIG. 17 is a plan view exemplarily showing a structure of an electrode 90 according to a preferred embodiment of the present disclosure.

Referring to FIG. 17, the electrode 90 has a sheet-shaped electrode current collector 91 made of a conductive material foil, an active material layer 92 formed on at least one surface of the electrode current collector 91, and an uncoated portion 93 formed at a long side end of the electrode current collector 91 and not coated with an active material.

Preferably, the uncoated portion 93 may include a plurality of notched segments 93a. The plurality of segments 93a constitute a plurality of groups, and the segments 93a included in each group may have the same height (length in the Y direction) and/or the same width (length in the X direction) and/or the same separation pitch. The number of segments 93a belonging to each group may be increased or decreased than shown. The segment 93a may have a trapezoidal shape, which may be changed into a rectangular, parallelogram, semicircular, semi-elliptical shape, or the like.

Preferably, the height of the segment 93a may be increased stepwise from the core toward the outer circumference. In addition, a core-side uncoated portion 93' adjacent to the core may not include the segment 93a, and the height of the core-side uncoated portion 93' may be smaller than that of other uncoated portion regions.

Optionally, the electrode 90 may include an insulating coating layer 94 for covering the boundary between the active material layer 92 and the uncoated portion 93. The insulating coating layer 94 includes an insulating polymer resin, and may optionally include an inorganic filler further. The insulating coating layer 94 prevents the end of the active material layer 92 from coming into contact with the opposite-polarity active material layer opposite thereto through the separator, and serves to structurally support the bending of the segment 93a. To this end, when the electrode 90 is wound into an electrode assembly, it is preferable that the insulating coating layer 94 is at least partially exposed from the separator to the outside.

Figure 18:
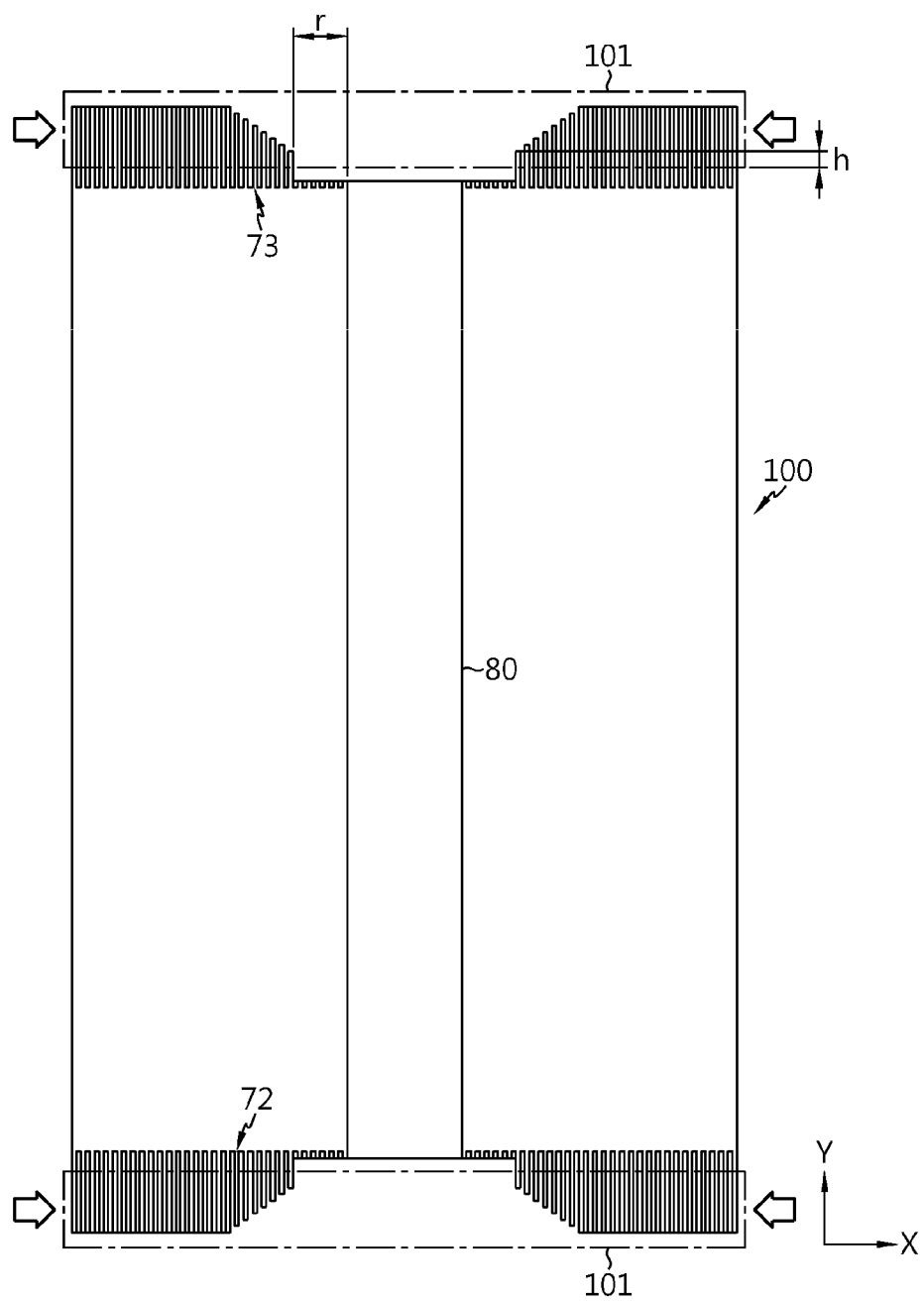
FIG. 18 is a sectional view showing an electrode assembly in which a segment structure of an uncoated portion of the electrode according to an embodiment of the present disclosure is applied to a first electrode and a second electrode, taken along the longitudinal direction Y.

FIG. 18 is a sectional view showing an electrode assembly 100 in which a segment structure of an uncoated portion of the electrode 90 according to an embodiment of the present disclosure is applied to the first electrode and the second electrode, taken along a plane including the axial direction Y and the radial direction Z.

Referring to FIG. 18, the electrode assembly 100 may be manufactured by the winding method described with reference to FIG. 2. For convenience of explanation, the protruding structure of the uncoated portions 72, 73 extending out of the separator is illustrated in detail, and the winding structure of the first electrode, the second electrode and the separator is not illustrated in detail. The uncoated portion 72 protruding downward extends from the first electrode, and the uncoated portion 73 protruding upward extends from the second electrode.

The pattern in which the heights of the uncoated portions 72, 73 change is schematically shown. That is, the heights of the uncoated portions 72, 73 may vary irregularly depending on the position at which the cross-section is cut. For example, when the side portion of the trapezoidal segment 93a is cut, the height of the uncoated portion at the cross section is lower than the height of the segment 93a. Accordingly, it should be understood that the heights of the uncoated portions 72, 73 depicted in the drawing showing the cross-section of the electrode assembly 100 correspond to the average of the heights of the uncoated portions included in each winding turn.

Figure 19:
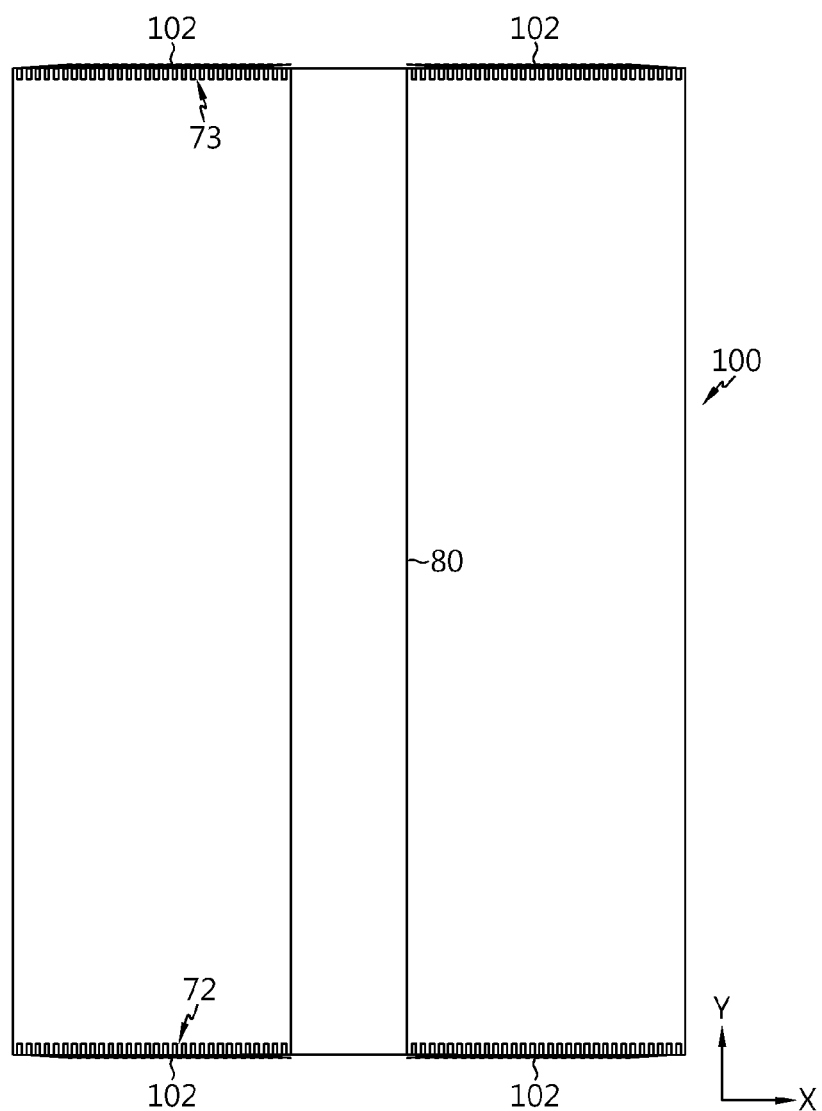
FIG. 19 is a sectional view showing an electrode assembly in which the uncoated portion is bent according to an embodiment of the present disclosure, taken along the longitudinal direction Y.

The uncoated portions 72, 73 may be bent from the outer circumference of the electrode assembly 100 toward the core, as shown in FIG. 19. In FIG. 18, the bent portion 101 is indicated by a dotted line box. When the uncoated portions 72, 73 are bent, bent surfaces 102 are formed at the upper and lower portions of the electrode assembly 100 as the segments adjacent to each other in a radius direction overlap each other in multiple layers. At this time, the core-side uncoated portion 93' (see FIG. 17) is not bent due to its low height, and the height h of the segment bent at the innermost side is less than or equal to the radius-direction length r of the winding region formed by the core-side uncoated portion 93' with no segment structure. Therefore, the cavity 80 in the core of the electrode assembly 100 is not closed by the bent segments. If the cavity 80 is not closed, there is no difficulty in the electrolyte injection process, and the electrolyte injection efficiency is improved. In addition, the electrode terminal 50 and the second current collector 79 may be easily welded by inserting a welding tool through the cavity 80.

In the cylindrical battery 70 according to the embodiment of the present disclosure, the cap 74a of the sealing body 74 has no polarity. Instead, the first current collector 78 is connected to the sidewall of the battery housing H, so that the outer surface 52a of the bottom 52 has polarity opposite to the electrode terminal 50. Therefore, when a plurality of batteries are to be connected in series and/or in parallel, wiring such as bus bar connection may be performed at one side of the cylindrical battery 70 using the electrode terminal 50 and the outer surface 52a of the bottom 52. Through this, the energy density may be improved by increasing the number of batteries that can be mounted in the same space.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $0 \leq x$, $1 \leq x+y \leq 2$, $-0.1 \leq z \leq 2$; and the stoichiometric coefficients x, y and z are selected so that the compound maintains electrical neutrality).

In another example, the positive electrode active material may be an alkali metal compound $xLiM_1O_2-(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \leq x \leq 1$).

In still another example, the positive electrode active material may be lithium metal phosphate expressed by a general formula $Li_aM^1_xFe_{1-x}M^2_yP_{1-y}M^3_zO_{4-z}$ ($M^1$ includes at least one element selected from the Ti, Si, Mn, Co, Fe, V, Cr, Mo, Ni, Nd, Al, Mg and Al; M 2 includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0<a \leq 2$, $0 \leq x \leq 1$, $0 \leq y<1$, $0 \leq z<1$; the stoichiometric coefficient a, x, y and z are selected so that the compound maintains electrical neutrality), or $Li_3M_2(PO_4)_3$[M includes at least one element selected from Ti, Si, Mn, Fe, Co, V, Cr, Mo, Ni, Al, Mg and Al].

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, low-crystalline carbon, high-crystalline carbon or the like may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

At least one surface of the separator may include a coating layer of inorganic particles. It is also possible that the separator itself is made of a coating layer of inorganic particles. The particles constituting the coating layer may have a structure coupled with a binder so that interstitial volumes exist among adjacent particles.

The inorganic particles may be made of an inorganic material having a dielectric constant of 5 or more. The inorganic particles may include at least one material selected from the group consisting of $Pb(Zr,Ti)_3$ (PZT), $Pb_{1-x}La_xZr_{1-y}Ti_yO_3$ (PLZT), $PB(Mg_3Nb_{2/3})O_3$, $PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

The electrolyte may be a salt having a structure like $A^+B^-$. Here, $A^+$ includes an alkali metal cation such as $Li^+$, $Na^+$, or $K^+$, or a combination thereof and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlC_{14}^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The cylindrical battery according to the above embodiment may be used to manufacture a battery pack.

Figure 20:
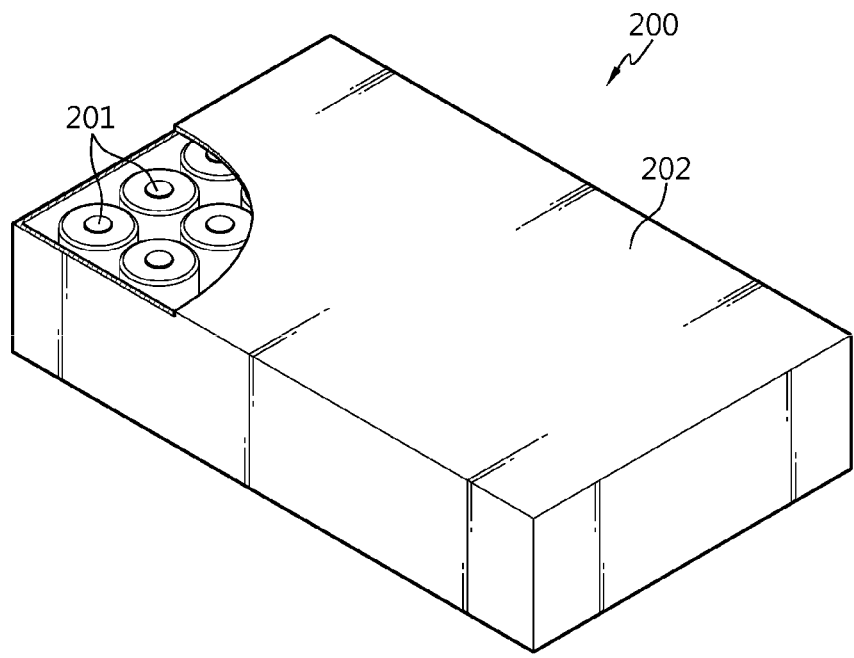
FIG. 20 is a diagram showing a schematic configuration of a battery pack including the cylindrical batteries according to an embodiment of the present disclosure.

FIG. 20 is a diagram schematically showing a battery pack according to an embodiment of the present disclosure.

Referring to FIG. 20, a battery pack 200 according to an embodiment of the present disclosure includes an aggregate in which cylindrical batteries 201 are electrically connected, and a pack housing 202 for accommodating the aggregate. The cylindrical battery 201 may be the battery according to the above embodiment. In the drawing, components such as a bus bar for electrical connection of the cylindrical batteries 201, a cooling unit, and an external terminal are not depicted for convenience of illustration.

The battery pack 200 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 21:
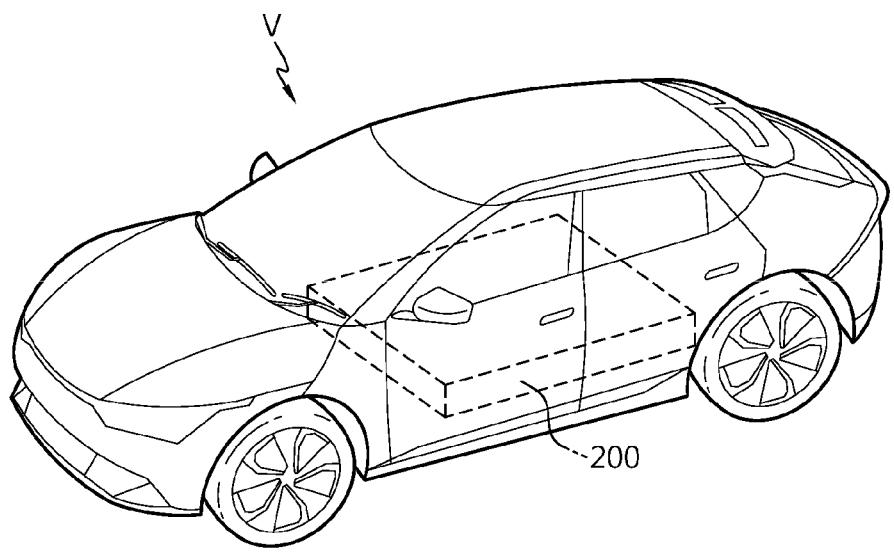
FIG. 21 is a diagram showing a schematic configuration of a vehicle including the battery pack according to an embodiment of the present disclosure.

FIG. 21 is a diagram for illustrating a vehicle including the battery pack 200 of FIG. 20.

Referring to FIG. 21, a vehicle V according to an embodiment of the present disclosure includes the battery pack 200 according to an embodiment of the present disclosure. The vehicle V operates by receiving power from the battery pack 200 according to an embodiment of the present disclosure.

It should be understood that the foregoing embodiments are illustrative in all respects and not restrictive, and the scope of the present disclosure will be indicated by the following claims rather than the foregoing detailed description. Also, the meaning and scope of the following claims as well as all the changes and transformable forms derived from the equivalent concept thereof should be interpreted as falling within the scope of the present disclosure.

The present disclosure has been described above with reference to illustrative drawings, but the present disclosure is not limited by the embodiments disclosed in this specification and the drawings, and it is obvious that various modifications can be made by those skilled in the art within the scope of the technical idea of the present disclosure. In addition, although the operational effects according to the configuration of the present disclosure are not explicitly described and explained while explaining the embodiment of the present disclosure, it is natural that effects expectable by the corresponding configuration should also be recognized.

What is claimed is:

1. A fixing structure of an electrode terminal, comprising:
   a battery housing having an open end at a first side and a bottom with a perforation hole at a second side opposite the first side, the bottom having a first surface and a second surface opposite the first surface;
   an electrode terminal fixed to the bottom; and
   a terminal gasket located between the electrode terminal and the bottom,
   wherein the electrode terminal includes:
      a neck portion having a cross section smaller than a cross section of the perforation hole, the neck portion being inserted into the perforation hole;
      a head portion connected to a first end of the neck portion, the head portion having a cross section larger than the cross section of the perforation hole, the head portion extending along the first surface of the bottom;
      a protrusion connected to a second end of the neck portion opposite the first end along an axial direction of the battery housing from the second surface of the bottom;
      a diameter-enlarged portion extending in a radial direction from the protrusion; and
      a front end surface at an axial end of the protrusion, and
   wherein the diameter-enlarged portion is a fastening member physically coupled to an outer circumference of the protrusion.

2. The fixing structure of an electrode terminal according to claim 1, wherein the outer circumference of the protrusion has a fastening groove extending along a circumferential direction, and
   wherein the fastening member is inserted into and fixed to the fastening groove.

3. The fixing structure of an electrode terminal according to claim 2, wherein the fastening groove has a male thread shape, and
   wherein the fastening member is a nut with a female thread fastened to the fastening groove.

4. The fixing structure of an electrode terminal according to claim 2, wherein the fastening groove is an O-shaped groove, and
   wherein the fastening member is a C-shaped ring fitted into the O-shaped groove.

5. The fixing structure of an electrode terminal according to claim 2, wherein a surface of the fastening member facing the bottom includes a sidewall surface that is gradually spaced farther away from the bottom outward in the radial direction.

6. The fixing structure of an electrode terminal according to claim 5, wherein, when the fastening member is coupled to the fastening groove, the sidewall surface compresses the terminal gasket toward the bottom of the battery housing.

7. The fixing structure of an electrode terminal according to claim 1, further comprising a first sealing coating layer on an interface between the terminal gasket and the bottom of the battery housing.

8. The fixing structure of an electrode terminal according to claim 7, wherein the first sealing coating layer includes silicone resin, silicone acrylate or polyamideimide.

9. The fixing structure of an electrode terminal according to claim 1, further comprising a second sealing coating layer covering an exposed interface between the fastening member and the terminal gasket.

10. The fixing structure of an electrode terminal according to claim 9, wherein the second sealing coating layer covers an exposed interface between the terminal gasket and the bottom.

11. The fixing structure of an electrode terminal according to claim 9, wherein the second sealing coating layer includes silicone resin, silicone acrylate or polyamideimide.

12. The fixing structure of an electrode terminal according to claim 1, wherein the front end surface is spaced further from the second surface of the bottom in the axial direction of the battery housing than the diameter-enlarged portion is spaced from the second surface of the bottom.

13. The fixing structure of an electrode terminal according to claim 1, wherein the front end surface includes a flat portion.

14. The fixing structure of an electrode terminal according to claim 1, wherein the fastening member has a first region that is gradually spaced farther away from the bottom of the battery housing while extending in the radial direction from the protrusion.

15. The fixing structure of an electrode terminal according to claim 14, wherein, in the first region, an angle between a surface of the fastening member facing the bottom and the bottom is greater than 0 degrees and equal to or less than 60 degrees.

16. The fixing structure of an electrode terminal according to claim 1, wherein a diameter of a section of the diameter-enlarged portion is greater than a diameter of the perforation hole.

17. The fixing structure of an electrode terminal according to claim 1, wherein a diameter of a section of the diameter-enlarged portion gradually increases away from the bottom of the battery housing.

18. The fixing structure of an electrode terminal according to claim 1, wherein a portion of the terminal gasket located between the head portion and the bottom of the battery housing is in a compressed state.

19. A battery, comprising:
   an electrode assembly in which a first electrode and a second electrode are wound with a separator interposed therebetween, the electrode assembly including an uncoated portion of the first electrode and an uncoated portion of the second electrode extending from opposite ends of the electrode assembly beyond the separator;
   a battery housing accommodating the electrode assembly therein, the battery housing having an open end at a first side and a bottom opposite at a second side opposite the first side, the bottom having a perforation hole, the bottom having a first surface and a second surface opposite the first surface, the battery housing being electrically connected to the first electrode;
an electrode terminal located in the perforation hole so as not to contact an inner wall of the perforation hole, the electrode terminal being electrically connected to the second electrode, the electrode terminal including:
a neck portion having a cross section smaller than a cross section of the perforation hole, the neck portion being inserted into the perforation hole;
a head portion connected to a first end of the neck portion, the head portion having a cross section larger than the cross section of the perforation hole, the head portion extending along the first surface of the bottom;
a protrusion connected to a second end of the neck portion opposite the first end along an axial direction of the battery housing from the second surface of the bottom;
a diameter-enlarged portion extending in a radial direction from the protrusion, the diameter-enlarged portion being a fastening member at-physically coupled to an outer circumference of the protrusion; and
a front end surface at an axial end of the protrusion;
a terminal gasket located between the electrode terminal and the perforation hole; and
a sealing body configured to seal the open end of the battery housing while being insulated from the battery housing.

20. The battery according to claim 19, wherein the outer circumference of the protrusion has a fastening groove extending along a circumferential direction, and
wherein the fastening member is inserted into and fixed to the fastening groove.

21. The battery according to claim 20, wherein the fastening groove has a male thread shape, and
wherein the fastening member is a nut with a female thread fastened to the fastening groove.

22. The battery according to claim 20, wherein the fastening groove is an O-shaped groove, and
wherein the fastening member is a C-shaped ring fitted into the O-shaped groove.

23. The battery according to claim 20, wherein a surface of the fastening member facing the bottom includes a sidewall surface that is gradually spaced farther away from the bottom outward in the radial direction.

24. The battery according to claim 23, wherein, when the fastening member is coupled to the fastening groove, the sidewall surface compresses the terminal gasket toward the bottom of the battery housing.

25. The battery according to claim 19, further comprising a first sealing coating layer on an interface between the terminal gasket and the bottom of the battery housing.

26. The battery according to claim 25, wherein the first sealing coating layer includes silicone resin, silicone acrylate or polyamideimide.

27. The battery according to claim 19, further comprising a second sealing coating layer covering an exposed interface between the fastening member and the terminal gasket.

28. The battery according to claim 27, wherein the second sealing coating layer covers an exposed interface between the terminal gasket and the bottom.

29. The battery according to claim 27, wherein the second sealing coating layer includes silicone resin, silicone acrylate or polyamideimide.

30. The battery according to claim 19, wherein the battery housing includes a beading portion adjacent to the open end, and
wherein the sealing body includes:
a cap with no polarity; and
a sealing gasket located between an edge of the cap and the open end of the battery housing.

31. The battery according to claim 30, wherein the battery housing further includes a crimping portion bent inward to overlap and fix the edge of the cap together with the sealing gasket.

32. The battery according to claim 31, further comprising a first current collector coupled to the uncoated portion of the first electrode,
wherein at least a part of an edge of the first current collector not in contact with the uncoated portion of the first electrode is located between the beading portion and the sealing gasket and fixed by the crimping portion.

33. The battery according to claim 32, wherein at least a part of the edge of the first current collector is fixed by welding to an inner circumference of the beading portion adjacent to the crimping portion.

34. The battery according to claim 19, further comprising a second current collector coupled to the uncoated portion of the second electrode,
wherein at least a part of the second current collector is welded to the front end surface of the electrode terminal.

35. The battery according to claim 34, further comprising an insulator located between the second current collector and the second surface of the bottom of the battery housing and between an inner circumference of a sidewall extending from the bottom of the battery housing and the electrode assembly.

36. The battery according to claim 19, wherein a ratio obtained by dividing a diameter of the battery by a height of the battery is greater than 0.4.

37. The battery according to claim 19, wherein an AC resistance measured through the electrode terminal of the battery and the first surface of the bottom of the battery housing is 4 milliohms or less.

38. A battery pack, comprising a plurality of batteries according to claim 19.

39. A vehicle, comprising the battery pack according to claim 38.

* * * * *